(12) United States Patent
Smith et al.

(10) Patent No.: US 10,046,865 B2
(45) Date of Patent: Aug. 14, 2018

(54) APPARATUS AND METHOD FOR INSTALLATION OF A FRAME ASSEMBLY TO A BODY

(71) Applicant: The Boeing Company, Chicago, IL (US)

(72) Inventors: Ryan A. Smith, Mount Pleasant, SC (US); Vincent M Boyle, Jr., Mount Pleasant, SC (US); Li Chun Chang, North Charleston, SC (US); Amy L. Suthon, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 1275 days.

(21) Appl. No.: 13/890,666

(22) Filed: May 9, 2013

(65) Prior Publication Data

US 2014/0331473 A1 Nov. 13, 2014

(51) Int. Cl.
| | | |
|---|---|---|
| *B25B 27/14* | (2006.01) | |
| *B64F 5/00* | (2017.01) | |
| *B64F 5/10* | (2017.01) | |
| *B64F 5/50* | (2017.01) | |
| *B64C 1/06* | (2006.01) | |

(52) U.S. Cl.
CPC ............. *B64F 5/0009* (2013.01); *B64F 5/10* (2017.01); *B64F 5/50* (2017.01); *B64C 1/068* (2013.01); *Y10T 29/49828* (2015.01); *Y10T 29/53961* (2015.01)

(58) Field of Classification Search
USPC ................................ 29/281.1, 897.2, 897.32
See application file for complete search history.

(56) References Cited

U.S. PATENT DOCUMENTS

| 2,486,378 | A | * | 11/1949 | Amiot .................... B64F 5/0009 |
| | | | | 269/37 |
| 5,560,102 | A | * | 10/1996 | Micale .................... B23P 21/00 |
| | | | | 29/407.1 |
| 5,709,769 | A | | 1/1998 | Bullen et al. |
| 8,266,778 | B2 | | 9/2012 | Neuhaus et al. |
| 2006/0118235 | A1 | * | 6/2006 | Lum ......................... B25B 5/14 |
| | | | | 156/285 |
| 2010/0181426 | A1 | | 7/2010 | Haack |
| 2012/0043008 | A1 | | 2/2012 | Niermann et al. |
| 2012/0066907 | A1 | | 3/2012 | Gallant et al. |
| 2012/0145514 | A1 | * | 6/2012 | Magni .................... B62D 65/02 |
| | | | | 198/345.1 |
| 2014/0103591 | A1 | * | 4/2014 | Petit ....................... B62D 65/18 |
| | | | | 269/55 |

FOREIGN PATENT DOCUMENTS

DE 100 30 499 1/2002

* cited by examiner

*Primary Examiner* — Joseph J Hail
*Assistant Examiner* — Shantese McDonald
(74) *Attorney, Agent, or Firm* — Walters & Wasylyna LLC

(57) ABSTRACT

An apparatus and method for installation of a frame assembly to a body may include a tooling assembly configured to support a frame assembly, the tooling assembly being positioned with respect to a body, wherein the frame assembly is positioned with respect to the body at a plurality of predetermined engineering locations.

20 Claims, 17 Drawing Sheets

APPARATUS AND METHOD FOR INSTALLATION OF A FRAME ASSEMBLY TO A BODY

FIELD

The present disclosure is generally related to structural frame assemblies and, more particularly, to an apparatus and method for installation of a plurality of frame elements defining a frame assembly to a body.

BACKGROUND

Some modern commercial aircraft include a barrel fabricated from a one-piece composite body. In order to provide sufficient structural rigidity to the body, a frame assembly must be fastened to the body. The frame assembly may be defined by a plurality of individual frame elements. The frame elements must not only be fastened at correct predetermined locations upon the body, but must also be fastened to other adjacent frame elements.

Individual placement and fastening of frame elements may lead to frame assembly mislocation. Accordingly, undesired stresses may be applied to the body and the frame elements as a result of mislocation of the fastened frame assembly. Additionally, various other nonconformance issues may arise from mislocation of the frame assembly. For example, secondary interior structures, such as flooring, may not be properly installed as a result of mislocation. Thus, custom parts must be designed, fabricated, and installed resulting in significant cost associated with rework, repair, replacement parts, and out of sequence work.

Accordingly, those skilled in the art continue with research and development efforts in the field of structural frame assemblies, including the installation of a plurality of frame elements defining a frame assembly relative to a one-piece body.

SUMMARY

In one embodiment, the disclosed apparatus for installation of a frame assembly to a body may include a tooling assembly configured to support a frame assembly, the tooling assembly being positioned proximate a body, wherein the frame assembly is positioned with respect to the body at a plurality of predetermined engineering locations.

In another embodiment, the disclosed apparatus for installation of a frame assembly to a body may include a tooling assembly including a plurality of tooling segments configured to support a plurality of frame elements defining a frame assembly, each tooling segment of the plurality of tooling segments including a plurality of tooling elements, and each tooling element of the plurality of tooling elements being configured to support one frame element of the plurality of frame elements, and at least one positioning device configured to support each tooling segment of the plurality of tooling segments for positioning of each tooling segment with respect to the body, wherein each frame element of the plurality of frame elements is positioned with respect to a surface of the body at a predetermined engineering location to form the frame assembly upon positioning of the tooling assembly proximate the body.

In yet another embodiment, disclosed is a method for installation of a frame assembly to a body, the method may include the steps of: (1) providing a body, (2) providing a plurality of frame elements defining a frame assembly, (3) providing a tooling assembly, the tooling assembly being configured to support the plurality of frame elements, (4) loading the plurality of frame elements onto the tooling assembly, (5) positioning the tooling assembly proximate the body such that the plurality of frame elements are positioned with respect to the body proximate a plurality of engineering locations, (6) fastening the plurality of frame elements to the body at the plurality of engineering locations, and (7) removing the tooling assembly from the body.

Other embodiments of the disclosed apparatus and method for installation of a frame assembly to a body will become apparent from the following detailed description, the accompanying drawings and the appended claims.

DETAILED DESCRIPTION

Figure 1:
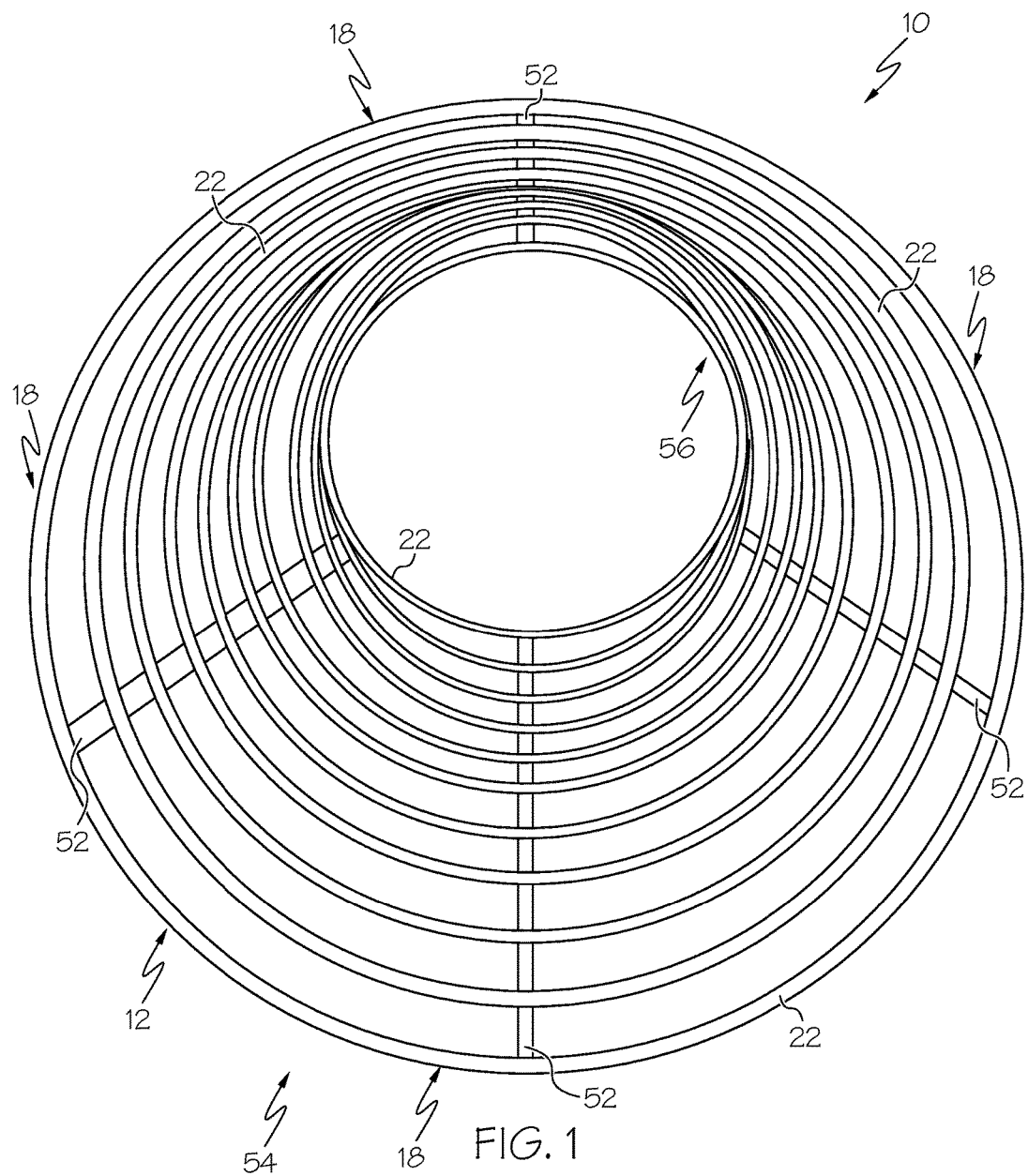
FIG. 1 is a front elevational view of one embodiment of the disclosed apparatus for installation of a frame assembly to a body.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 2:
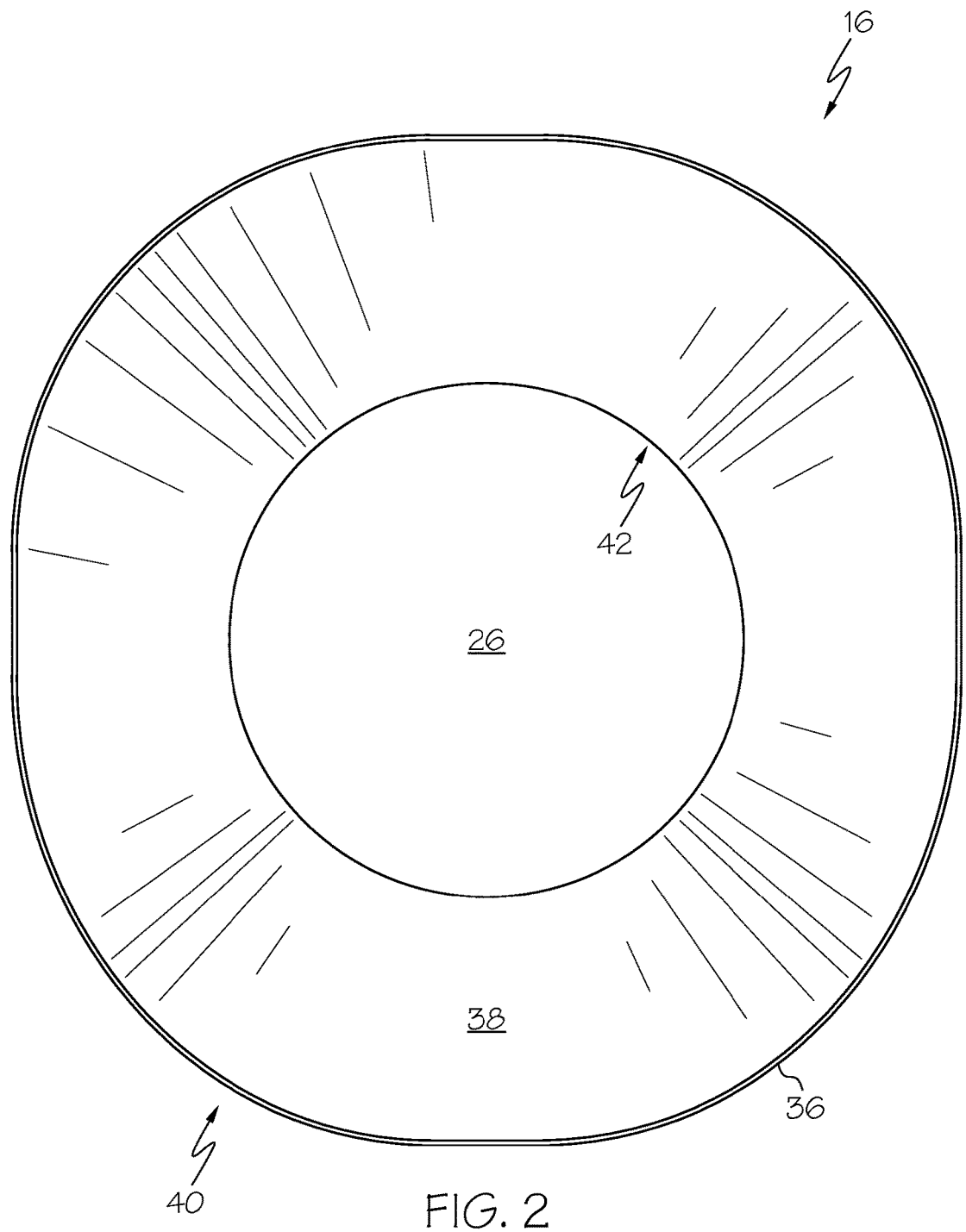
FIG. 2 is a front elevational view of one embodiment of the disclosed body.

Referring to FIG. 1, the disclosed apparatus for installation of a frame assembly to a body, generally designated 10, may include a tooling assembly 12 configured to support a structural frame assembly 14 (FIG. 3) for connection to a surface of a body 16 (FIG. 2). The tooling assembly 12 may include either a single or segmented piece of machine tooling having a ribcage design configured to hold the frame assembly 14 in true position within engineering tolerance for connection to the body 16. The tooling assembly 12 may locate the frame assembly 14 or a portion of the frame assembly 14 (e.g., a frame segment 18 (FIG. 7)) proximate the surface of the body 16. For example, the tooling assembly 12 and supported frame assembly 14 may be received within the body 16 such that the frame assembly 14 is proximate an interior surface 38 of the body 16 (FIG. 2). As another example, the tooling assembly 12 and supported frame assembly 14 may be positioned about an exterior of the body 16 such that the frame assembly 14 is proximate an exterior surface 36 of the body 16 (FIG. 2).

Figure 3:
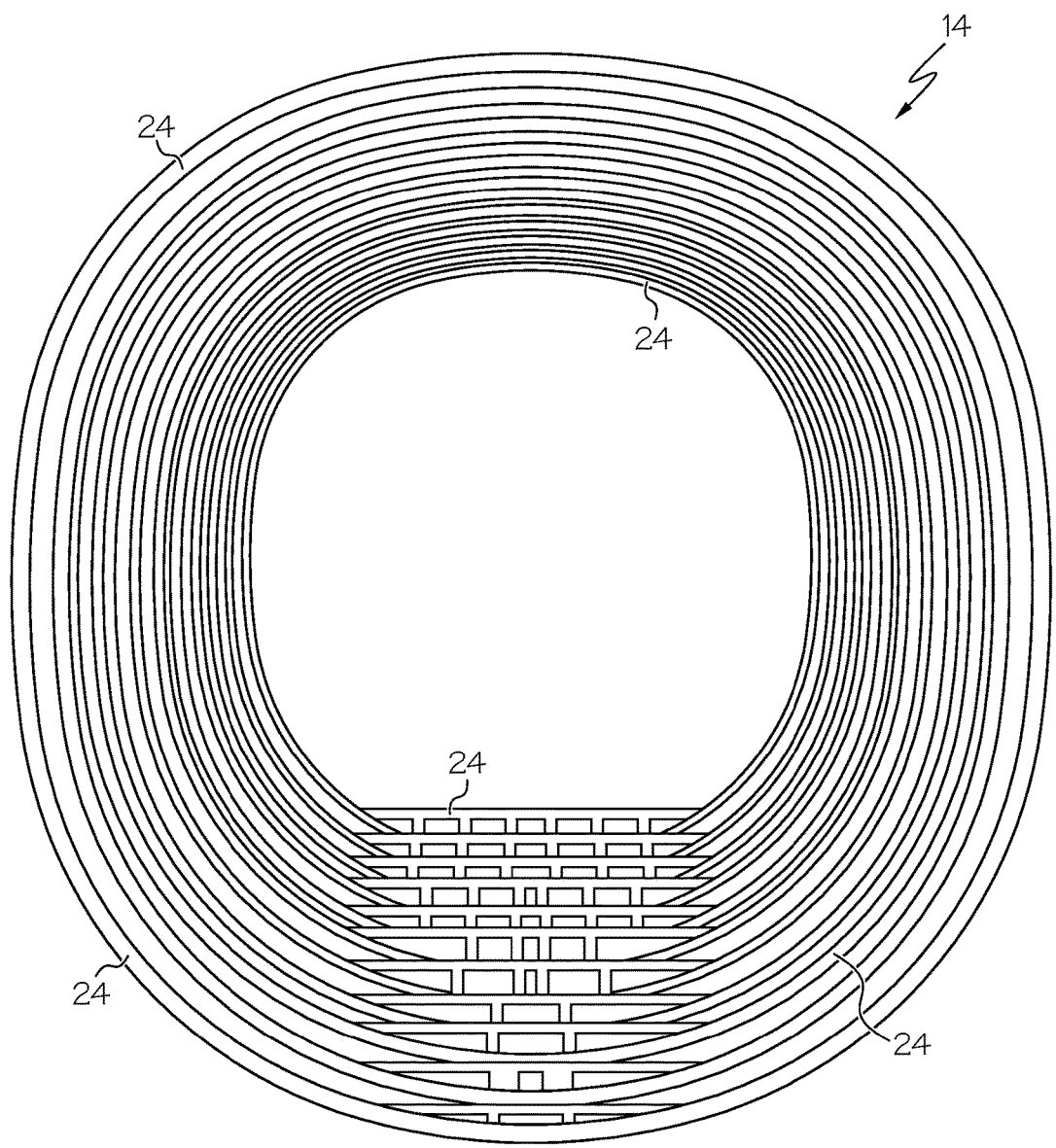
FIG. 3 is a front elevational view of one embodiment of the disclosed structural frame assembly.
Figure 14:
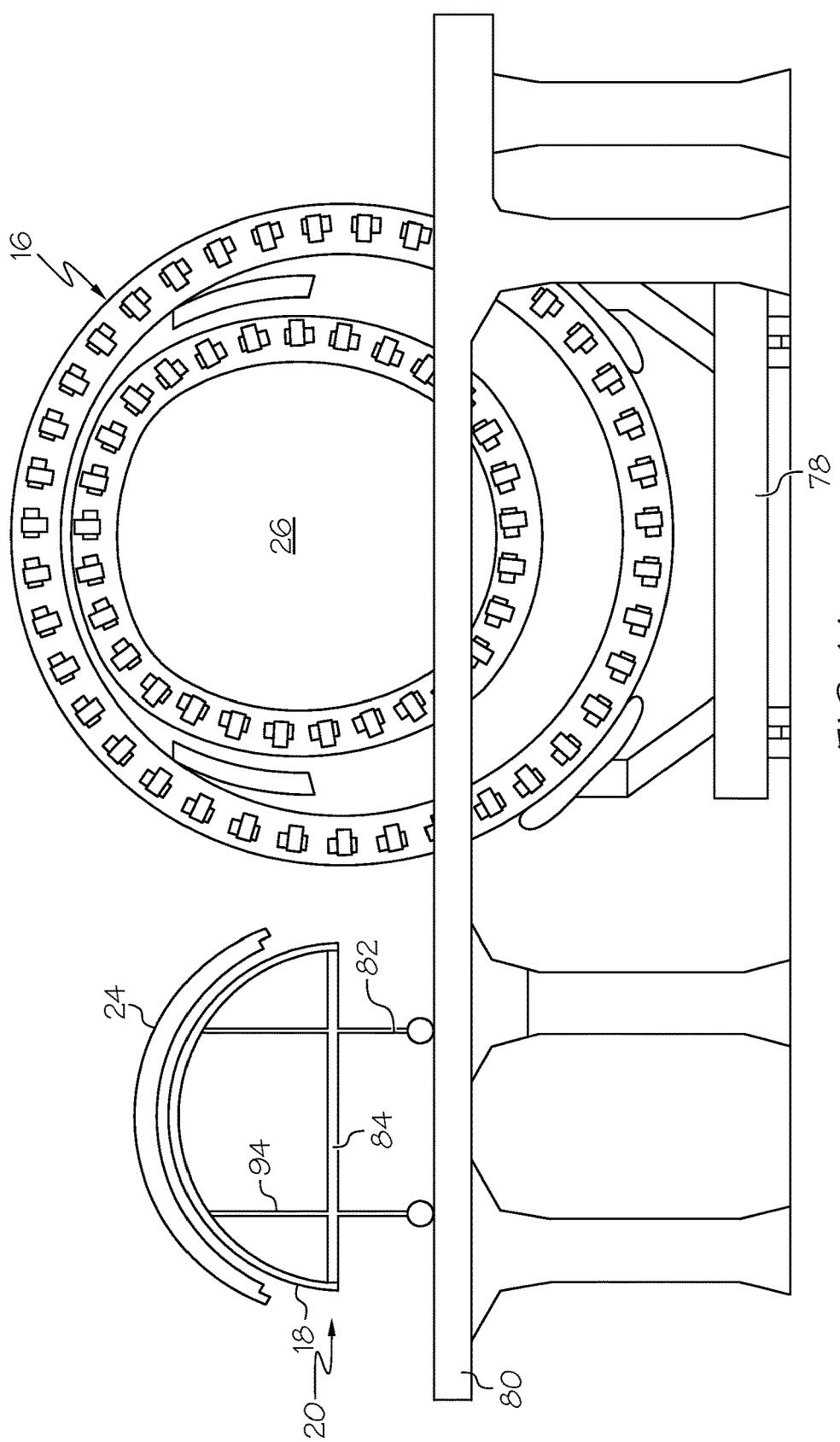
FIG. 14 is an illustration of an example method of installing the frame assembly relative to the body using the disclosed apparatus.
Figure 15:
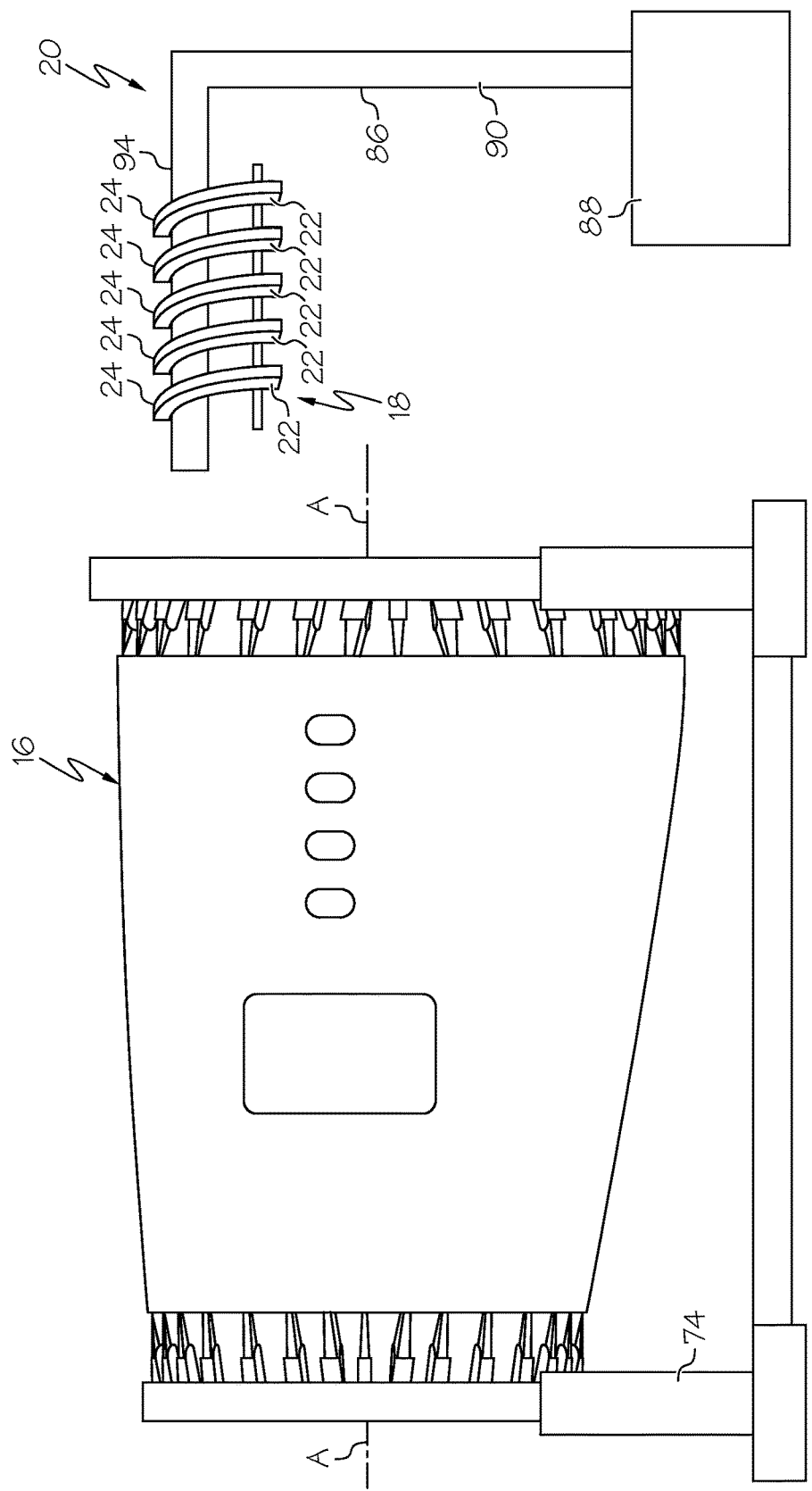
FIG. 15 is an illustration of another example method of installing the frame assembly relative to the body using the disclosed apparatus.
Figure 16:
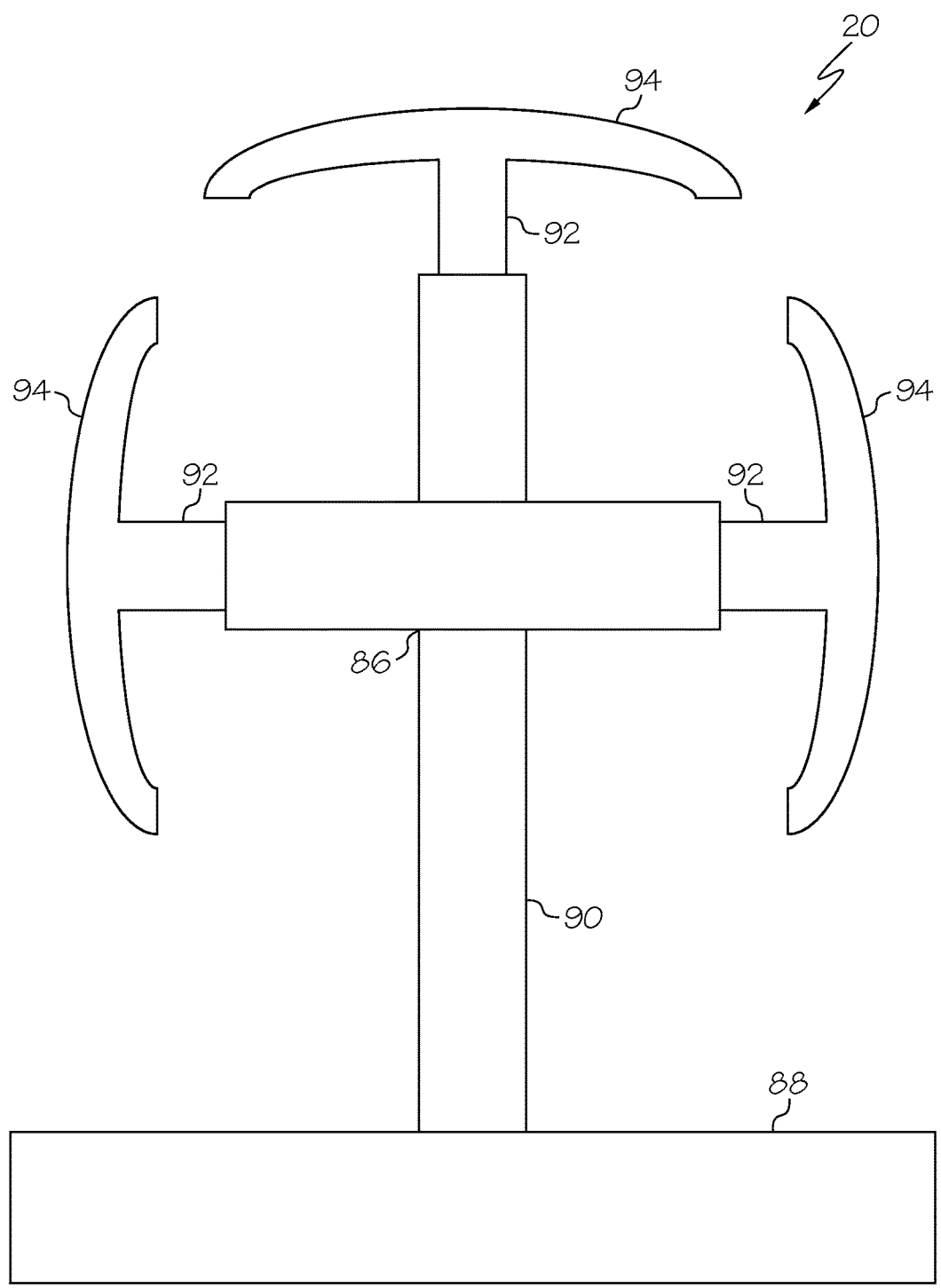
FIG. 16 is a front view of one embodiment of the installation device of the disclosed apparatus.

As will be described in further detail herein, the disclosed apparatus 10 may include at least one tooling assembly 12 and at least one positioning device 20 (FIGS. 14-16). The positioning device 20 may be configured to move and support the tooling assembly 12 with respect to the surface of the body 16. In an example implementation, the positioning device 20 may be configured to support the tooling assembly 12 during insertion of the tooling assembly 12 and the frame assembly 14 proximate the interior surface 38 (e.g., within an interior 26) of the body 16 (FIG. 3). In another example implementation, the positioning device 20 may be configured to support the tooling assembly 12 during positioning of the tooling assembly 12 and the frame assembly 14 proximate the exterior surface 36 of the body 16. For example, the positioning device 20 may be a cart 82 (FIG. 14) or an arm assembly 86 (FIGS. 15 and 16).

Referring to FIG. 2, the body 16 may be any shell forming an outer surface (e.g., skin) of a manufactured structure or component. For example, the body 16 may be a unitary (e.g., one-piece) member fabricated of a composite material. The body 16 may have any cross-sectional perimeter shape. For example, the body 16 may have a circular cross-sectional perimeter shape, an ovular cross-sectional perimeter shape, a rectangular cross-sectional perimeter shape, or may have any other symmetric or asymmetric geometric cross-sectional shape.

FIG. 2 illustrates an example construction of the body 16 depicted prior to installation (e.g., insertion and connection) of the frame assembly 14. The body 16 may include a first end 40, a second end 42, an exterior surface 36, and an interior surface 38. The second end 42 may be longitudinally spaced away from the first end 40. The body 16 may also have any overall shape (e.g., longitudinal shape) having a hollow interior region 26 configured to receive the frame assembly 14. A continuous wall of the body 16 may extend from proximate the first end 40 to proximate the second end 42 to define the shape of the body 16 and the interior region 26.

For example, as illustrated, the body 16 may be generally conical-shaped having a constant cross-sectional perimeter shape with a varying perimeter diameter along the longitudinal axis A (FIG. 15). As another example, the body 16 may be generally cylindrical-shaped having a constant cross-sectional perimeter shape with a constant perimeter diameter along the longitudinal axis A (FIG. 15). As another example, the body 16 may be generally rectangular-shaped having a square cross-sectional perimeter shape. As still another example, the body 16 may have a variable shape with a variable cross-sectional perimeter shape along the longitudinal axis A.

As a specific non-limiting example embodiment, the body 16 may be a barrel section (e.g., fuselage) of an aircraft having a substantially cylindrical or conical shape. The one-piece body 16 may include various cutouts, apertures, and the like configured as various access openings (e.g., window openings). One skilled in the art can appreciate that the body 16 may also be the barrel section of a rocket, the fuselage or tail boom of a helicopter, the shell body of a motor vehicle, the shell body of a boat, or other vehicular applications. One skilled in the art can also appreciate that the disclosed installation apparatus 10 configured to locate and install at least one frame assembly to a body (e.g., to an interior surface or to an exterior surface) may be utilized in other non-vehicular applications, such as industrial applications (e.g., structures), without limitation.

Referring to FIG. 3, the frame assembly 14 may include a plurality of structural frame elements 24. The frame assembly 14 may define the framework (e.g., load bearing frame) of the manufactured structure or component (e.g., aircraft fuselage). For example, each of the frame elements 24 may be connected (e.g., fastened) to the interior surface 38 of the body 16 (FIG. 2) at a predetermined (e.g., engineering) location 70 (FIG. 12) upon the body 16. As another example, each of the frame elements 24 may be connected (e.g., fastened) to the exterior surface 36 of the body 16 (FIG. 2) at a predetermined (e.g., engineering) location 70 (FIG. 12) upon the body 16. Each frame element 24 may be connected to at least one location 70 upon the surface of the body 16, such as by mechanical fasteners, chemical bonding, welding, soldering, or any other suitable attachment or assembly technique.

The present disclosure illustrates one frame assembly 14, formed by a plurality of frame elements 24, being installed (e.g., received and connected) within the body 16. However, one skilled in the art can appreciate that a plurality of bodies 16 may be connected to form a final structure or component (e.g., aircraft fuselage) and each body 16 of the plurality of bodies 16 may include a frame assembly 14 installed within by the disclosed apparatus 10, in accordance with the present disclosure, without limitation. It can also be appreciated that one or more frame assemblies 14 may be installed (e.g., positioned and connected) to an exterior of the body 16.

FIG. 3 illustrates an assembled frame assembly 14 with the body 16 removed for clarity. The assembled frame assembly 14 may have an overall shape (e.g., cross-sectional perimeter shape and longitudinal shape) substantially equivalent to that of the body 16 whether installed and connected to the interior surface 38 or the exterior surface 36.

Figure 4:
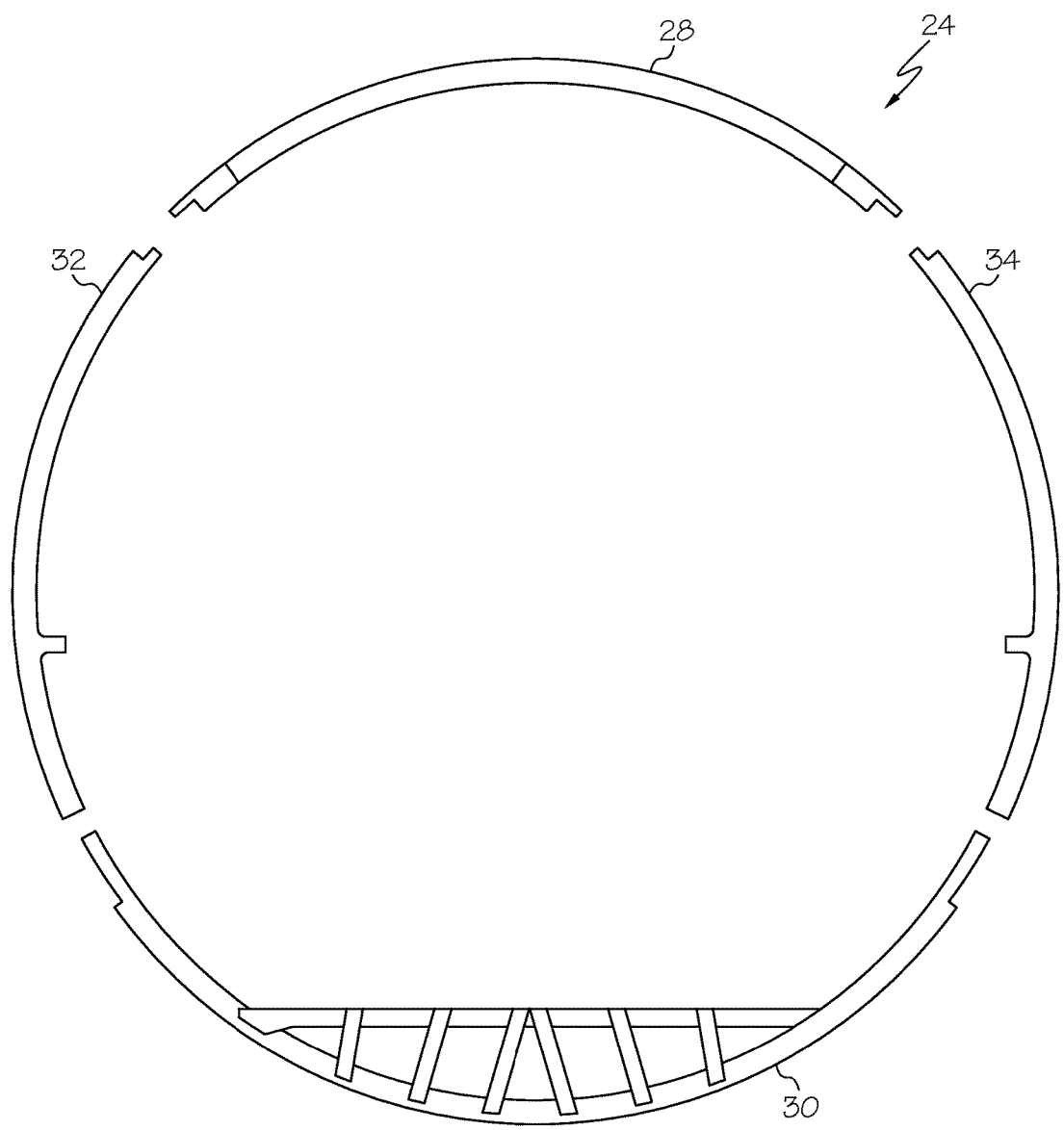
FIG. 4 is an exploded front elevational view of a portion of the frame assembly of FIG. 3.

Referring to FIG. 4, in accordance with the example aircraft embodiment, the plurality of structural frame elements 24 may include a crown (e.g., upper) frame element 28, a keel (e.g., lower) frame element 30, a first (e.g., left) side element 32, and a second (e.g., right) side element 34. A plurality of each type of frame element 28, 30, 32, 34 may define the assembled frame assembly 14 (FIG. 3). One skilled in the art can appreciate other types, configurations, and quantities of frame elements 24 may be used depending upon the final manufactured structure or component and whether the frame assembly 2 is installed to the interior or exterior of the body 16.

Figure 5:
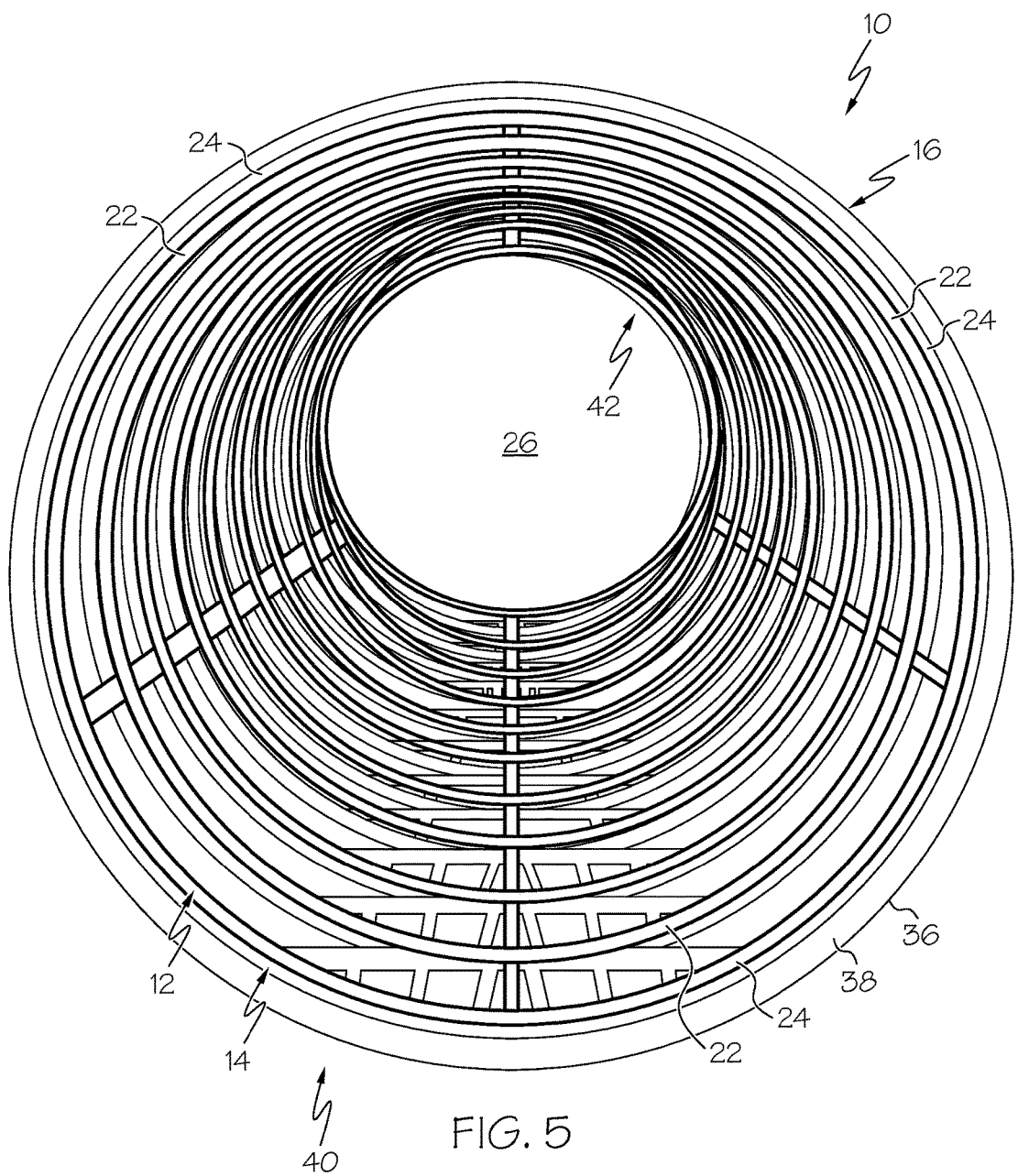
FIG. 5 is a front elevational view of the apparatus of FIG. 1 illustrating installation of the structural frame assembly of FIG. 3.

Referring to FIG. 5, the plurality of frame elements 24 may each be supported by the tooling assembly 12 for installation to the body 16 (e.g., to the interior surface 38 or the exterior surface 36). The tooling assembly 12 may have an overall shape (e.g., cross-sectional perimeter shape and longitudinal shape) substantially equivalent to that of the body 16. For example, the tooling assembly 12 may be suitably sized to be received within the interior region 26 of the body 16 such that the supported frame assembly 14 is proximate the interior surface 38 of the body 16. The tooling assembly 12, with the frame assembly 14 supported, may be inserted through an open end (e.g., the first end 40) by the positioning device 20 (FIGS. 14 and 15). As another example, the tooling assembly 12 may be suitably sized to surround an exterior region of the body 16 such that the supported frame assembly 14 is proximate the exterior surface 36 of the body 16. The tooling assembly 12, with the frame assembly 14 supported, may be positioned alongside the body 16 by the positioning device 20.

Referring to FIG. 5, the tooling assembly 12 may locate each of the frame elements 24 in a true position (e.g., the proper placement of the frame element 24 given an acceptable amount of variance) relative to the body 16 and the other frame elements 24. Any differences between the location of the frame assembly 14, or any individual frame element 24, and the shape of the body 16 (e.g., gaps between the frame element and the interior surface of the one-piece fuselage) can be addressed prior to permanent installation of the frame elements 24.

Figure 7:
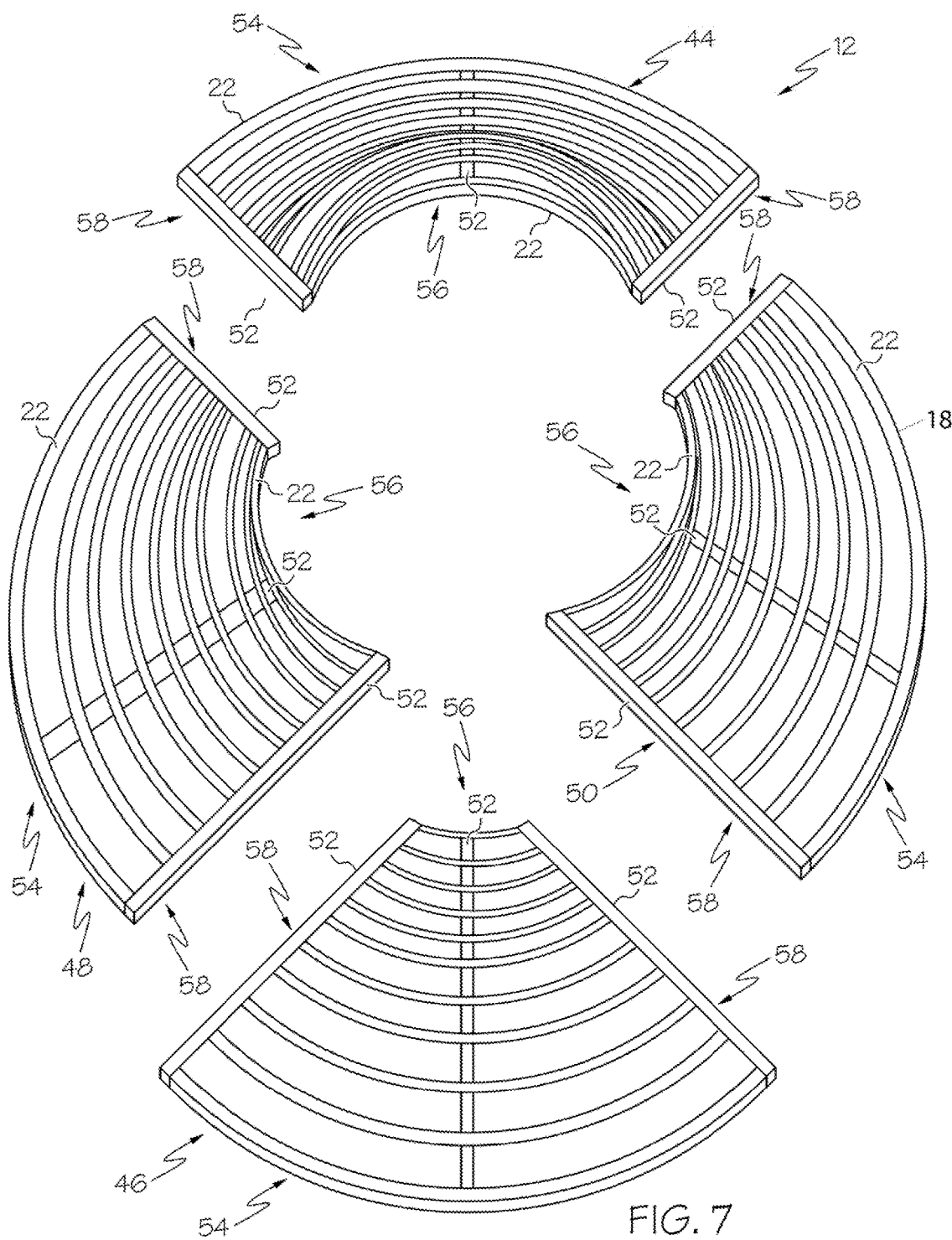
FIG. 7 is an exploded front elevational view of the apparatus of FIG. 1.

Referring to FIGS. 1, 2, 3 and 7, the tooling assembly 12 may include a first end 54 (FIG. 1) configured to be located proximate the first end 40 of the body 16 (FIG. 2) and a longitudinally opposed second end 56 (FIG. 1) configured to the located proximate the second end 42 of the body 16. The ribcage tooling assembly 12 may include a plurality of ribcage tooling segments 18 (FIG. 7). Each tooling segment 18 may be releasably connected to an adjacent tooling segment 18 to form the tooling assembly 12. Each tooling segment 18 may be configured to support and retain a plurality of frame elements 24 (FIG. 3). Thus, the plurality of tooling segments 18 may be arranged and connected to form an assembled tooling assembly 12 having a shape corresponding to the shape of the frame assembly 14 and to the body 16.

For example, the plurality of framework segments 18 may include an upper segment 44 configured to support and retain a plurality of crown frame elements 28, a lower segment 46 configured to support and retain a plurality of keel frame elements 30, a first (e.g., left) side segment 48 configured to support and retain a plurality of first side frame elements 32, and a second (e.g., right) side segment 50 configured to support and retain a plurality of second side frame elements 34.

Referring to FIG. 7, each tooling segment 18 may include a plurality of ribcage tooling elements 22 extending from the first end 54 to the second end 56. Each tooling segment 18 may be configured to support and retain a single frame element 24 of the frame assembly 14 (FIGS. 3 and 4). For example, each tooling element 22 may be sized and shaped to substantially match the size and shape of a corresponding frame element 24 and a corresponding portion of the body 16.

Figure 8:
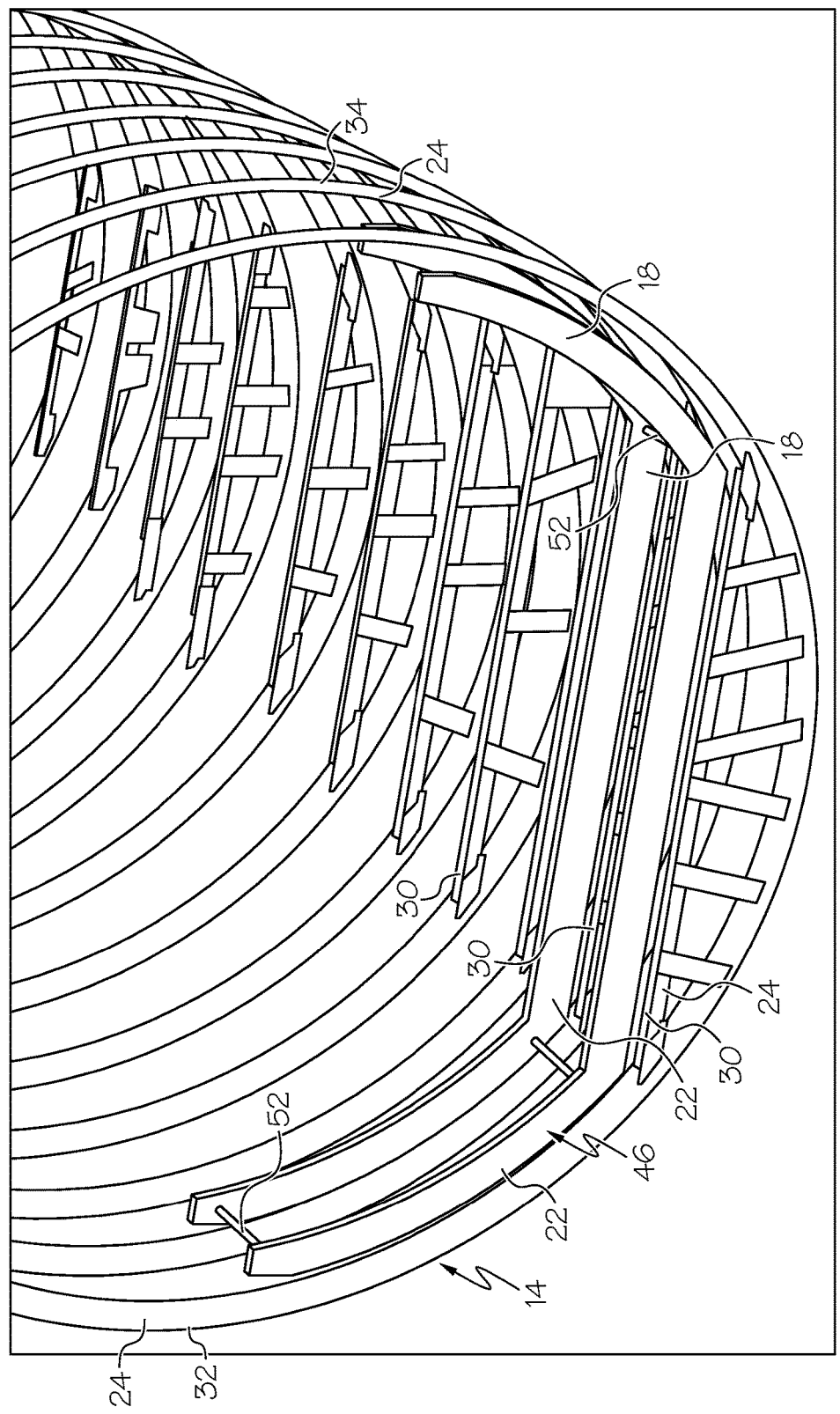
FIG. 8 is a front and side perspective view of the apparatus of FIG. 1.
Figure 9:
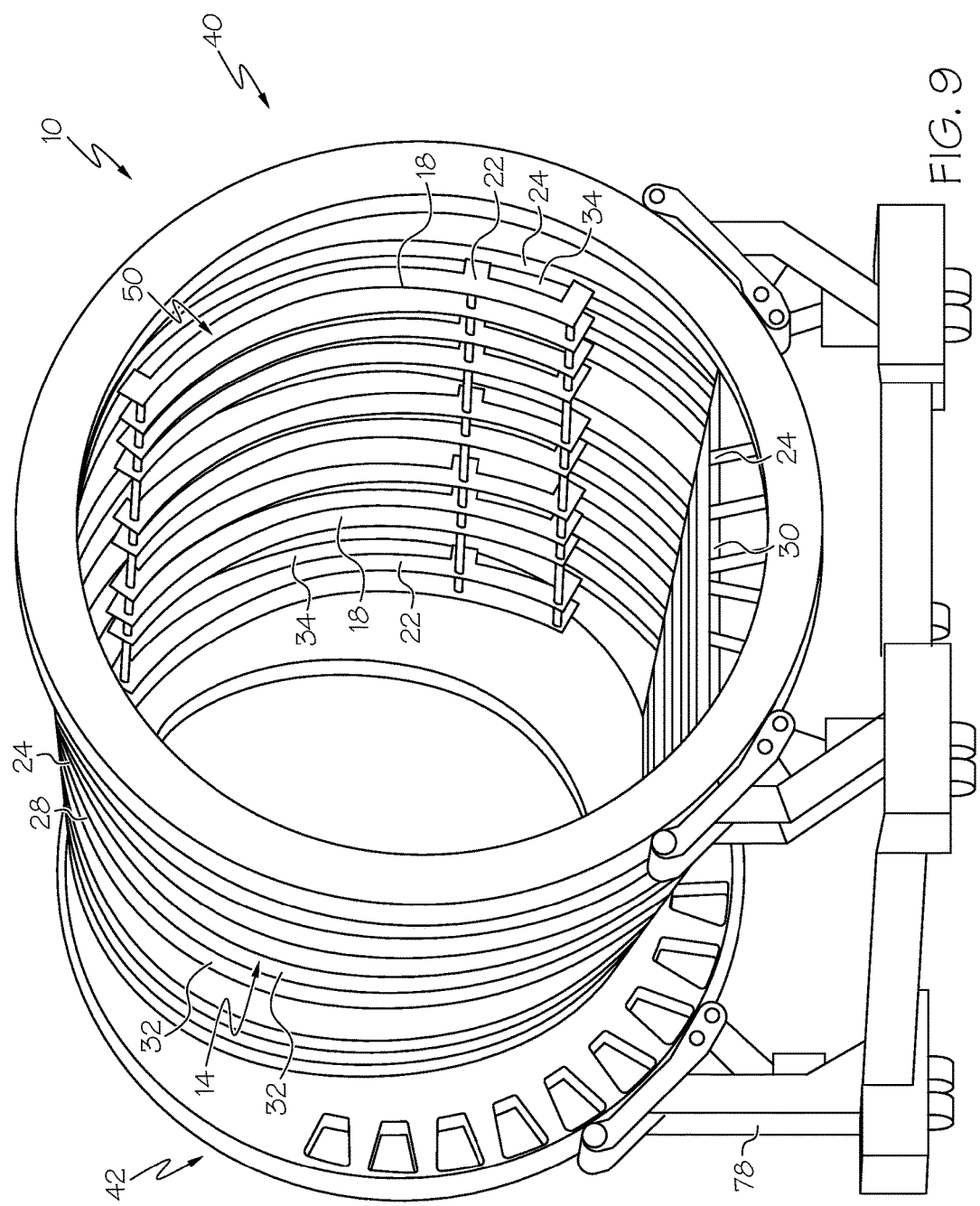
FIG. 9 is another front and side perspective view of the apparatus of FIG. 1.

Referring to FIGS. 8 and 9, generally each frame element 24 of the plurality of frame elements 24 supported and retained by a corresponding tooling segment 18 may be located at a predetermined position (e.g., at engineering locations 70 (FIG. 12)) with respect to the interior surface 38 (FIG. 11) or the exterior 36 of the body 16 (FIG. 2) and with respect to the other frame elements 24.

FIG. 8 illustrates an example of the frame assembly 14 as it would be positioned within a body 16 (the body is depicted as transparent for clarity of illustration) and two (2) tooling elements 22 supporting two (2) frame elements 24 (e.g., keel frame elements 30) of the plurality of frame elements 24 (e.g., a plurality of keel frame elements 30 and side frame elements 32, 34) in position relative to the body 16 and the other frame elements 24. Only two (2) tooling elements 22 (e.g., of a lower tooling segment 46) are shown for clarity and one skilled in the art can appreciated that in use additional tooling elements 22 may be associated with each of the frame elements 24.

FIG. 9 illustrates an example of the frame assembly 14, as it would be positioned within a body 16 (the body is depicted as transparent for clarity of illustration) and a plurality of tooling elements 22 supporting a plurality of frame elements 24 (e.g., a plurality of second side frame elements 34) in position relative to the body 16 and the other frame elements 24. A plurality of tooling elements 22 (e.g., of a second side tooling segment 50) are shown for clarity and one skilled in the art can appreciated that in use additional tooling elements 22 and tooling segments 18 may be associated with the frame elements 24.

It can be appreciated that the longitudinal length of the tooling assembly 12, or each tooling segment 18, may be substantially equivalent to the longitudinal length of the body 16, such that frame elements 24 are spaced apart from the first end 40 to the second end 42 of the body 16. The number of frame elements 24 required to form the full frame assembly 14 for the body 16 may define the number of tooling elements 22 of the tooling assembly 12 or each tooling segment 18.

Referring back to FIG. 7, the tooling elements 22 may be rigidly connected to adjacent (e.g., parallel) tooling elements 22, such as by a plurality of stringers 52. In an example construction, at least one stringer 52 may extend from the first end 54 to the second end 56 of each tooling segment 18 interconnecting each of the tooling elements 22. In another example construction, a plurality of stringer segments (FIG. 8) may be interconnected between adjacent pairs of tooling elements 22. Each tooling segment 18 may be releasably connected to an adjacent tooling segment 18 along a longitudinal edge 58.

Figure 10:
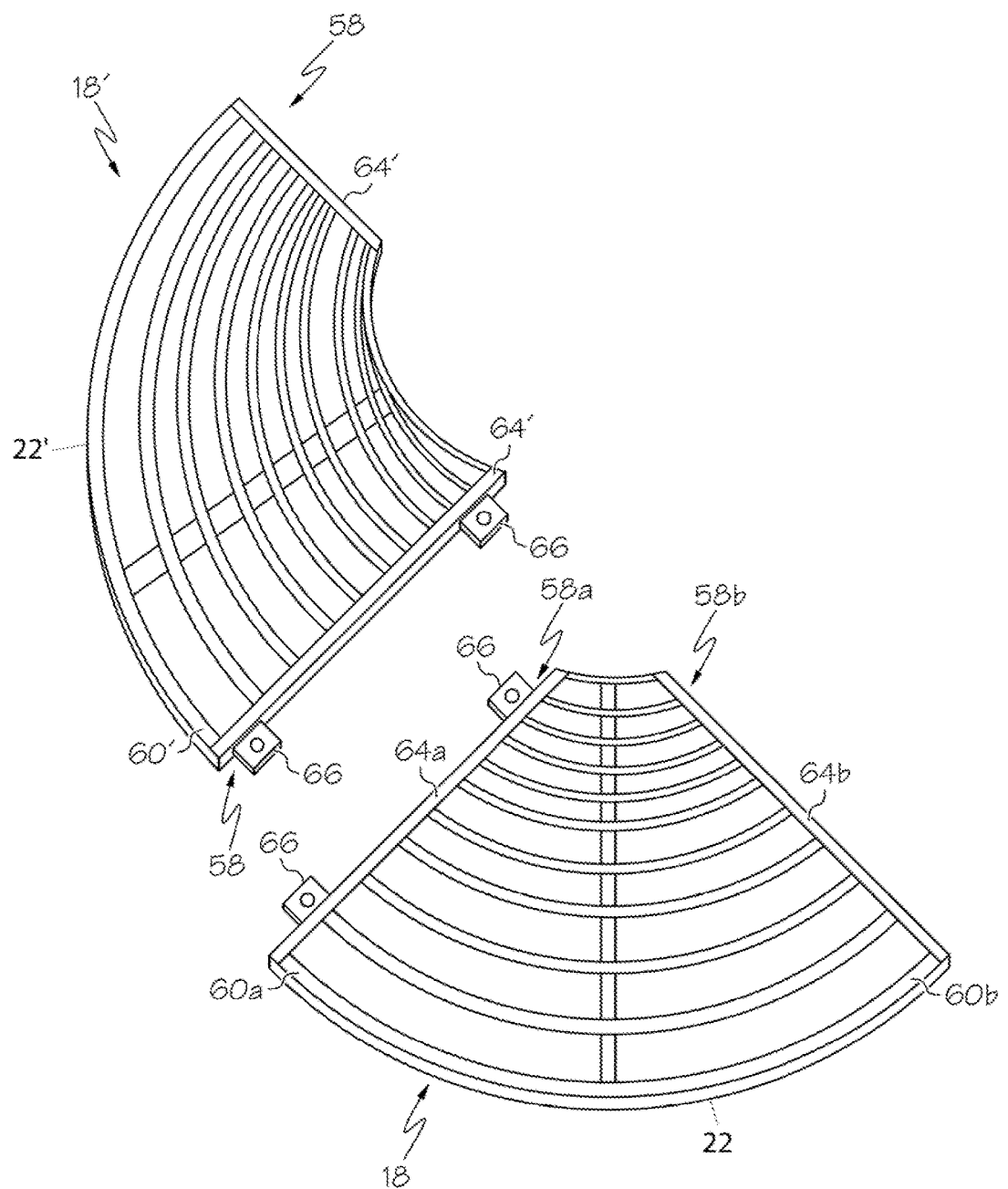
FIG. 10 is a front elevational view of a pair of tooling segments of the disclosed apparatus of FIG. 1.

Referring to FIG. 10, in an example construction, a first edge stringer 64a may be connected along first ends 60a of the plurality of tooling elements 22 defining a first longitudinal edge 58a of a tooling segment 18. A second edge stringer 64b may be connected along longitudinally opposed second ends 60b of the plurality of tooling elements 22 defining a second longitudinal edge 58b of the tooling segment 18. Each of the edge stringers 64a, 64b may be configured to releasably connect to an adjacent edge stringer 64' of an adjacent tooling segment 18'.

In another example construction, the first end 60a and second end 60b of each tooling element 22 of a tooling segment 18 may be configured to releasably connect to adjacent ends 60' of each adjacent tooling element 22' of an adjacent tooling segment 18'.

Each tooling segment 18 may be releasably connected by any suitable fastening mechanism 66. The fastening mechanism 66 may be configured to provide a quick connection and quick release of adjacent tooling segments 18. For example, each tooling segment 18 may include at least one fastening mechanism 66 positioned along each longitudinal edge 58.

As an example construction, the fastening mechanism 66 may include a flange disposed on each longitudinal edge 58. Each flange may include at least one through-hole aperture. Upon a pair of adjacent tooling segments 18 being positioned next to one another within the body 16, pairs of adjacent flanges may be positioned such that the aperture of each flange is aligned and configured to receive a fastener to connect the pair of adjacent tooling segments 18 together.

The fastener may be a bolt, a pin, a spring pin, any other suitable fastening mechanism, or the like, without limitation.

As another example construction, the fastening mechanism 66 may include a clamp or clip disposed on each longitudinal edge 58. Upon a pair of adjacent tooling segments 18 being positioned next to one another within the body 16, pairs of adjacent clamps or clips may be aligned and configured to operably engage to one another to connect the pair of adjacent tooling segments 18 together.

In another embodiment, the tooling assembly 12 may be a one-piece (e.g., integral) ribcage tooling structure including a plurality of rigidly affixed ribcage tooling elements 22.

Figure 11:
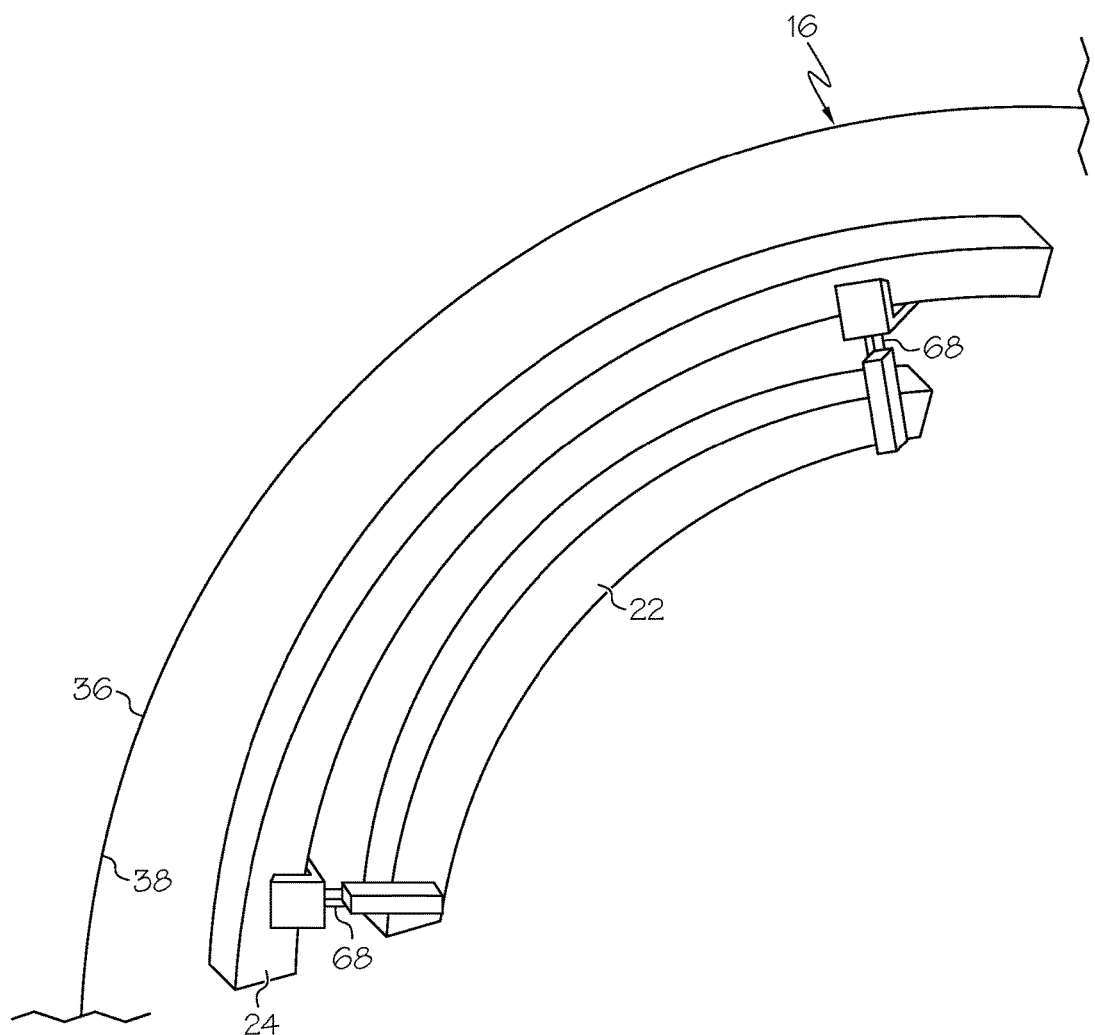
FIG. 11 is a perspective side view of the tooling element of the disclosed apparatus.
Figure 12:
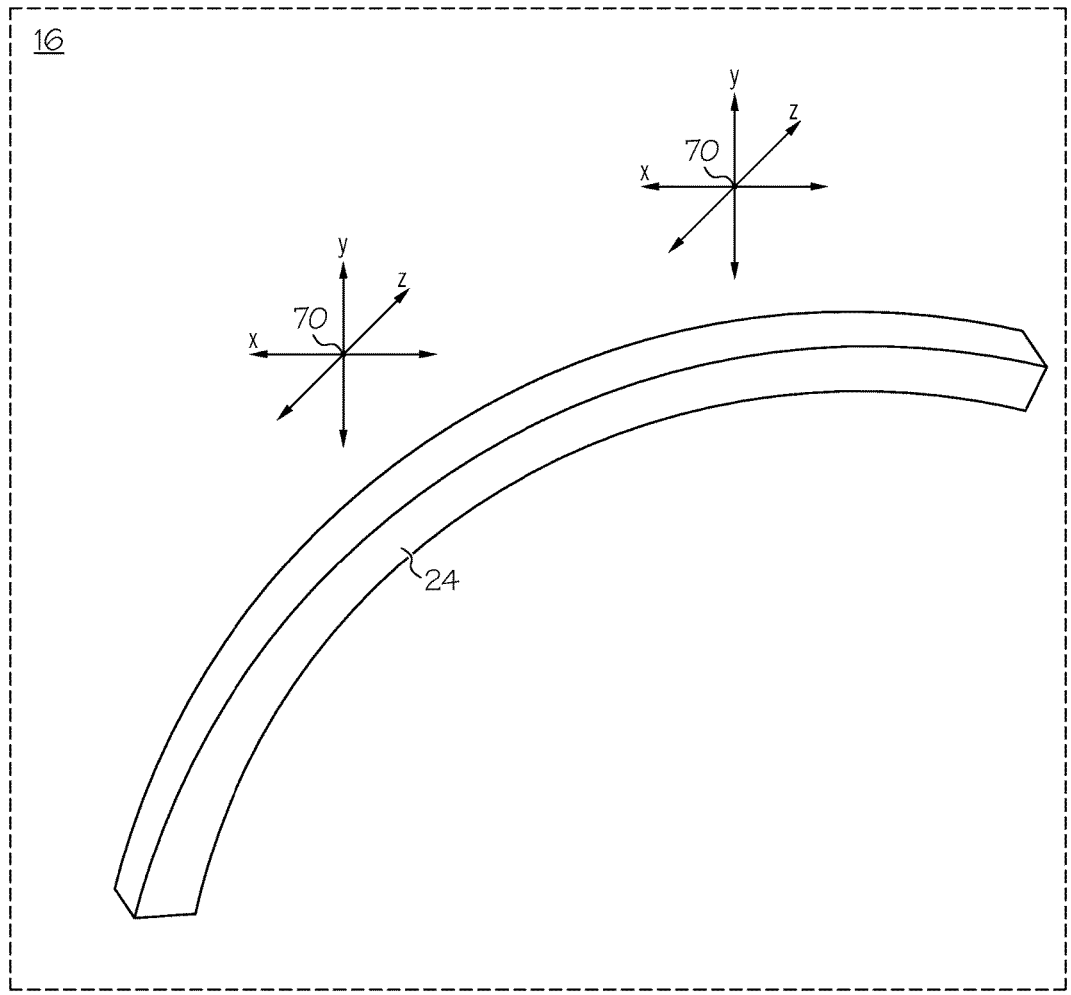
FIG. 12 is a schematic view of the position of the frame element with respect to the body.

Referring to FIG. 11, each tooling element 22 may include a plurality of cradle assemblies 68. Each cradle assembly 68 may be configured to support and retain a portion of a corresponding frame element 24. The tooling assembly 12, or each tooling segment 18, may be configured to position the plurality of frame elements 24 at or near the correct engineering location. In an example construction, the cradle assembly 68 may be movable in at least one direction with respect to the tooling element 22 and the surface (e.g., interior surface 38 or exterior surface 36) of the body 16 in order to further position the frame element 24 with respect to the body 16 (e.g., within acceptable tolerances to at least one engineering position 70 (FIG. 12). In another example construction, the cradle assembly 68 may be movable at least three directions with respect to the tooling element 22 and the surface (e.g., interior surface 38 or exterior surface 36) of the body 16 to further position the frame element 24 with respect to the body 16 (e.g., within acceptable tolerances to at least one engineering location 70).

Referring to FIG. 12, the cradle assembly 68 may be configured to position the frame element 24 at the correct engineering location 70 for connection upon the surface (e.g., interior surface 38 or exterior surface 36) of the body 16. For example, the cradle assembly 68 may be adjustably connected to the tooling element 22 such that the frame element 24 may be positioned at a correct X, Y, and Z location upon the body 16.

Figure 13:
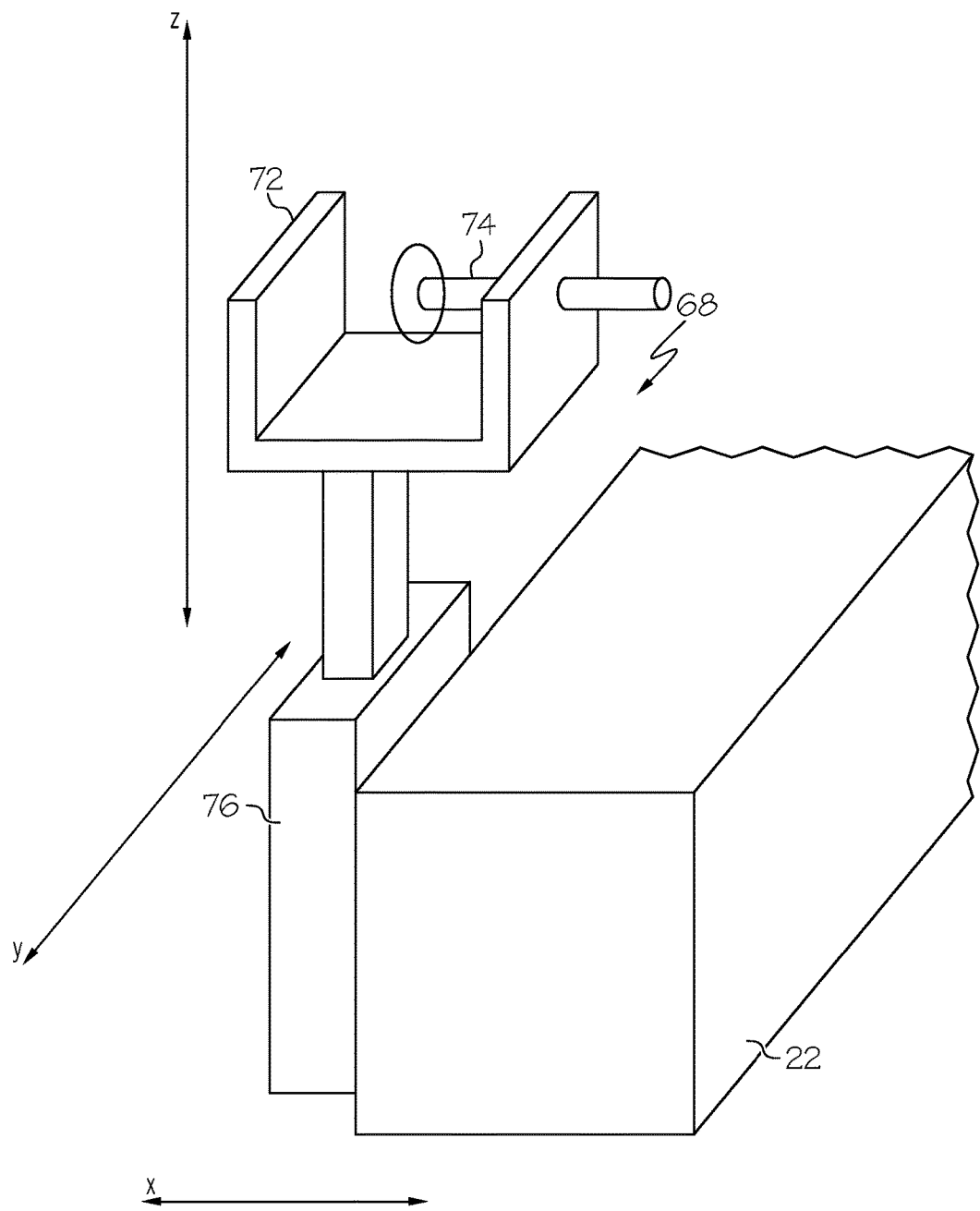
FIG. 13 is a partial perspective view of a tooling element and a cradle assembly.

Referring to FIG. 13, in an example construction, the cradle assembly 68 may include a saddle 72 configured to support and retain the frame element 24. For example, the saddle 72 may include a U-shaped member suitably sized to receive at least a portion of the frame element 24. The saddle 72 may include a clamping mechanism 74 configured to engageably retain the frame element 24 upon being received by the saddle 72. The clamping mechanism 74 may include at least one clamping member configured to contact a side of the frame element 24. For example, the clamping member may include a spring pin biased in a closed position, a screw clamp, a set screw, or the like.

The saddle 72 may be adjustably connected to a stanchion 76, for example to provide for motion in the Z-direction relative to the engineering location 70 (FIG. 12). The stanchion 76 may include a tubular body configured to receive a stem of the saddle 72 and configured to provide linear movement of the saddle 72 in a telescoping manner. The saddle 72 may be releasably connected at varying positions with respect to the stanchion 76, for example by a pin or similar mechanical fastener.

The stanchion 76 may be adjustably connected to the tooling element 22, for example to provide for motion in the X-direction and the Y-direction relative to the engineering location 70 (FIG. 12). As an example, the stanchion 76 may be slidably connected (e.g., along a track) to the tooling element 22 to provide linear movement of the stanchion 76. As another example, the stanchion 76 may be pivotally connected to the tooling element 22 to provide rotational movement of the stanchion 76. The stanchion 76 may be releasably locked at varying positions with respect to the tooling element 22, for example by a pin or similar mechanical fastener.

Referring to FIGS. 14 and 15, prior to installation of the frame assembly 14 to the body 16, the body 16 may be supported by any conventional or suitable tooling or holding fixture 78 (see also FIG. 9). The body holding fixture 78 may stabilize and support the body 16 in a substantially horizontal position. Alternatively, the holding fixture 78 may be configured to support the body 16 in a substantially vertical position. In certain embodiments, the body holding fixture 78 may be configured to rotate the body 16 about the longitudinal axis A, such as during installation of the frame assembly 14, as will be described in more detail below.

The positioning device 20 may be configured to support and hold the tooling assembly 12 at or near the engineered locations 70 (FIG. 12) on the surface (e.g., interior surface 38 or exterior surface 36) of the body 16 (FIG. 3) during installation of the frame assembly 14. The positioning device 20 may include a holding fixture 94 and a plurality of connection points each configured to secure the tooling segment 18. The holding fixture 94 may be configured to support and hold a particular configuration of tooling segment 18. The connection points may be positioned to engage the tooling segment 18 without interference with the adjustable positioning of the cradle assemblies 68.

Figure 6:
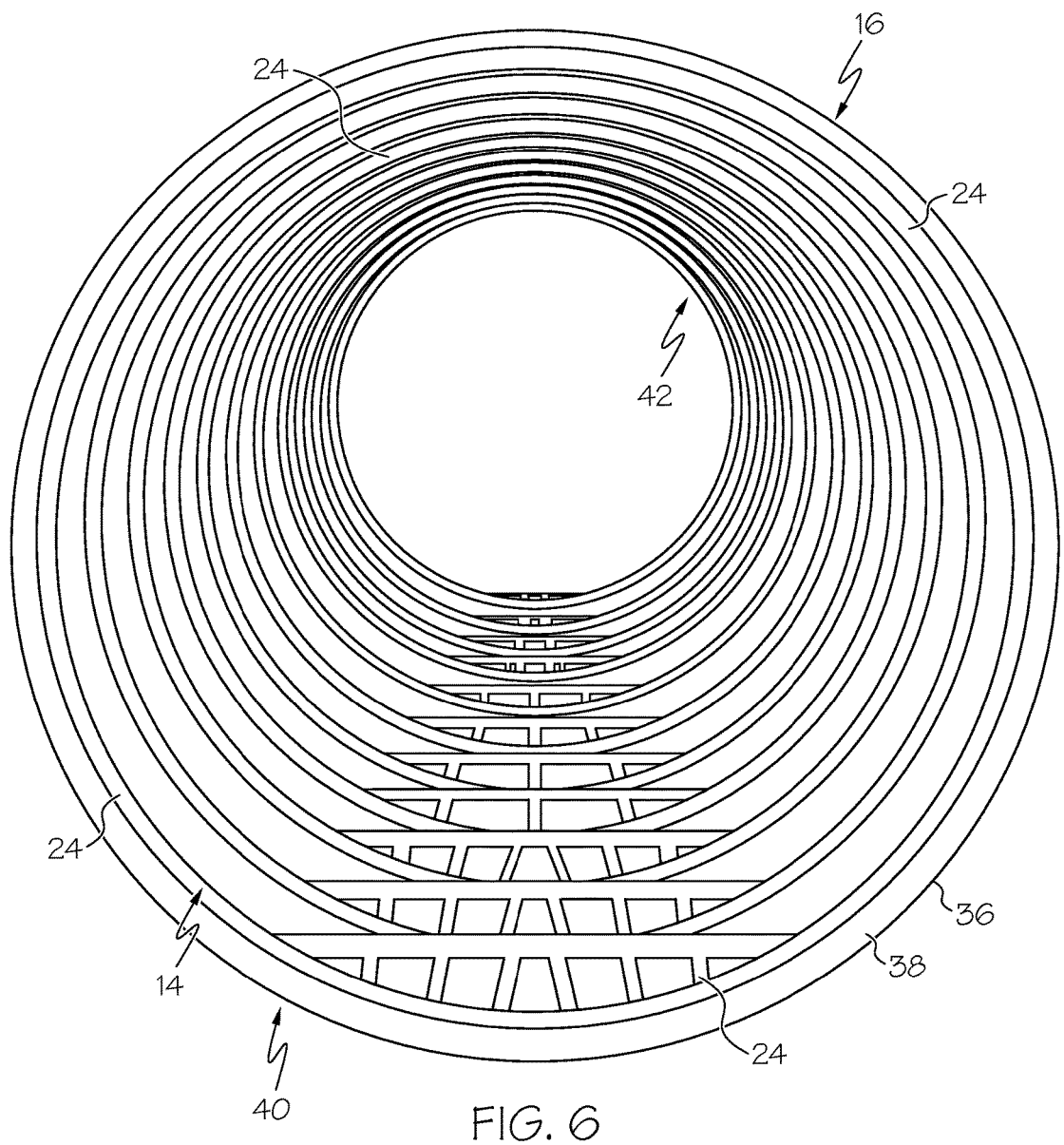
FIG. 6 is a front elevational view of one embodiment of the disclosed frame assembly of FIG. 3 connected to the apparatus of FIG. 1.

As shown in FIG. 14, in an example embodiment, the positioning device 20 may be a manually moveable cart 82. The cart 82 may include a wheeled chassis 84. The holding fixture 94 may be attached to the chassis 84 and configured to position and support a single tooling segment 18 or a plurality of tooling segments 18 while being positioned with respect to the body 16 (e.g., inserted within the interior region 26 (FIG. 2) of the body 16 or positioned proximate the exterior of the body 16). In an example method for installing the frame assembly 14 (FIG. 3) to the body 16 (FIG. 6), an installation platform 80 or similar support deck may be constructed around or adjacent to the body 16 to provide a support surface for movement of the positioning device 20 with respect to the body 16.

As shown in FIG. 15, in another example embodiment, the positioning device 20 may be a mechanical arm assembly 86. The arm assembly 86 may include a base 88 and at least one arm 90. The arm 90 may include the holding fixture 94 configured to support a single tooling segment 18 or a plurality of tooling segments 18 while being positioned with respect to the body 16 (e.g., inserted within the interior region 26 (FIG. 2) of the body 16 or positioned proximate the exterior of the body 16). The arm 90 may be movable with respect to the base 88 for positioning the tooling segment 18 with respect to the body 16. For example, the base 88 may include at least one drive mechanism (not shown) configured to move the arm 90 along an axis perpendicular to the longitudinal axis A (e.g., up and down) and to move the arm 90 along an axis parallel to the longitudinal axis A (e.g., in and out). The drive mechanism may be any suitable electrical drive, mechanical drive, hydraulic drive, pneumatic drive, or any other suitable type of driven mechanism, without limitation. As another example, the arm 90 may be manually positioned in any one of a variety of locations with respect to the base 88 and at least temporarily locked at that position, such as by a quick release fastener, clip, clamp, or any other suitable locking fastener or mechanism, without limitation.

Referring to FIG. 16, in another embodiment, the positioning device 20 may include an arm assembly 86 configured to support a plurality of tooling segments 18. The arm 90 may include a plurality of secondary arms 92. Each of the secondary arms 92 may include a holding fixture 94 configured to support a single tooling segment 18 or a plurality of tooling segments 18. The arm 90 may be movable with respect to the base 88 and each of the secondary arms 92 may be movable with respect to the arm 90 at a variety of locations. For example, the base 88 may include at least one drive mechanism (not shown) configured to move the arm 90 along an axis perpendicular to the longitudinal axis A (e.g., up and down) and to move the arm 90 along an axis parallel to the longitudinal axis A (e.g., in and out). The drive mechanism may also be configured to move each of the secondary arms 92 along an axis perpendicular to the longitudinal axis A (e.g., toward and away from the surface (e.g., interior surface 38 or exterior surface 36) of the body 16).

In another embodiment, the tooling segment 18 may be attached (e.g., integral) to the arm 90 or to an end of each secondary arm 92. In such a configuration, the holding fixture 94 may be eliminated.

Figure 17:
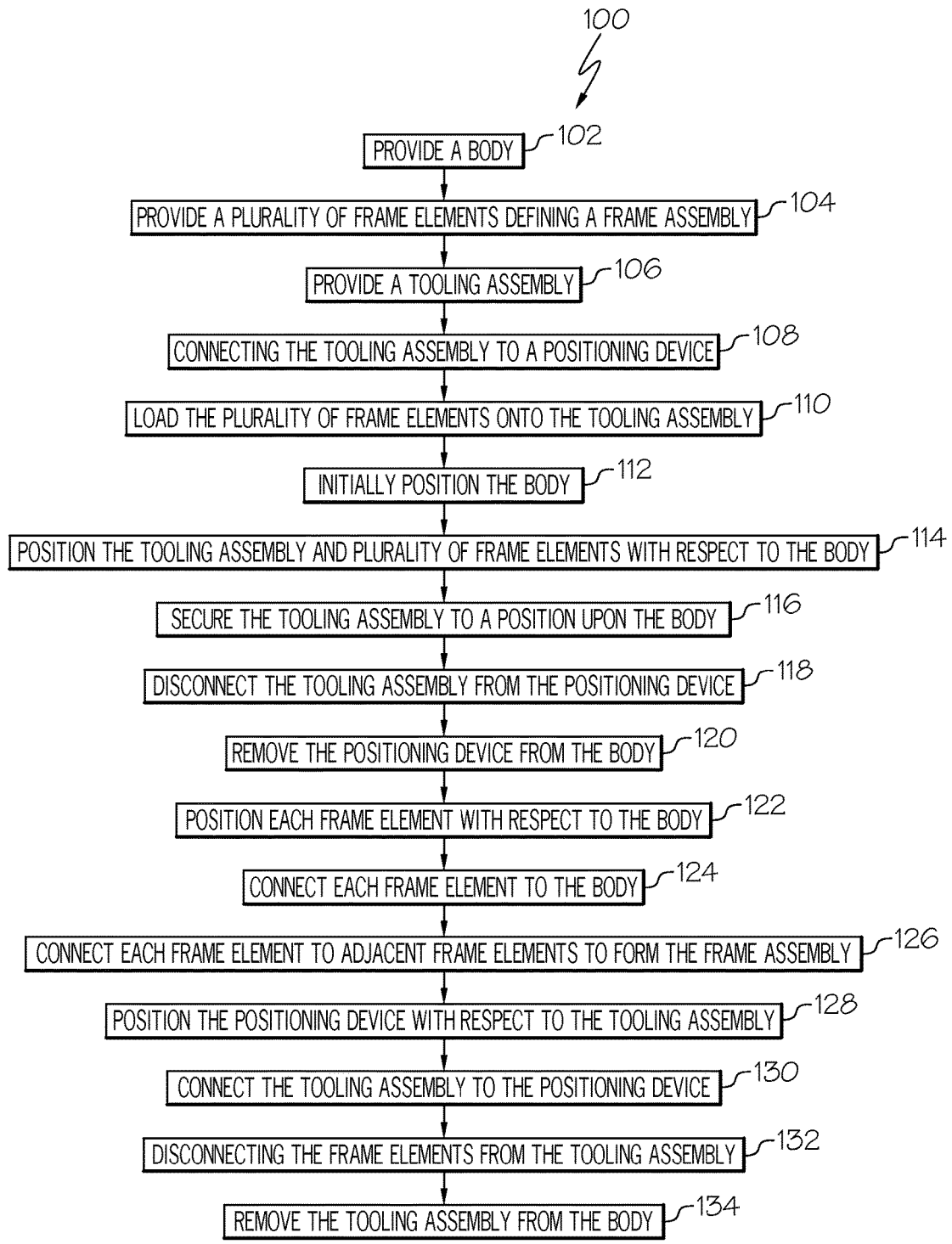
FIG. 17 is a flow diagram of the disclosed method for installing the frame assembly relative to a body.

Referring to FIG. 17, also disclosed is a method, generally designated 100, for installing a frame assembly to a body 16. As shown at block 102, a body 16 may be provided. In accordance with the aircraft example, the body 16 may be a one-piece composite barrel. The body 16 may include a plurality of engineering locations 70 (FIG. 12) for connection of a plurality of frame elements 24.

As shown at block 104, a plurality of frame elements 24 defining a frame assembly 14 may be provided (FIG. 3). In accordance with the aircraft example, the plurality of frame elements 24 may include a plurality of crown frame elements 28, a plurality of keel frame elements 30, a plurality of first side frame elements 32, and a plurality of second side frame elements 34 (FIG. 4).

As shown at block 106, a tooling assembly 12 (FIG. 1) may be provided. The tooling assembly 12 may be a single integral tooling assembly 12 having a plurality of tooling elements 22 or may be a plurality of connectable tooling segments 18. Each tooling segment 18 may include a plurality of tooling elements 22. In accordance with the aircraft example, the tooling assembly 12 may include an upper segment 44, a lower segment 46, a first side segment 48, and a second side segment 50 (FIG. 7).

As shown at block 108, the tooling assembly 12 may be loaded (e.g., connected) onto the positioning device 20 (FIGS. 14-16). For example, each tooling segment 18 may be loaded onto a dedicated positioning device 20 having a holding fixture 94 configured to hold that tooling segment 18. As another example, the integral or assembled tooling assembly 12 may be loaded onto a single positioning device having a plurality of holding fixtures each configured to hold a portion of the tooling assembly 12 (e.g., a tooling segment 18).

As shown at block 110, the plurality of frame elements 24 may be loaded onto the tooling assembly 12. Each frame member 24 may be connected to a corresponding tooling element 22, such as at the cradle assemblies 68 (FIG. 13). In one example method, all of the frame elements 24 may be loaded onto the integral tooling assembly 12. In another example method, a plurality of frame members 24 may be loaded on to each of the tooling segments 18. In accordance with the aircraft example, the plurality of crown frame elements 28 may be loaded on the tooling elements 22 of the upper segment 44, the plurality of keel frame elements 30 may be loaded on the tooling elements 22 of the lower segment 46, the plurality of first side frame elements 32 may be loaded on the tooling elements 22 of the first side segment 48, and the plurality of second side frame elements 34 may be loaded on the tooling elements 22 of the second side segment 50.

As shown at block 112, the body 16 may be positioned at an initial position (e.g., by rotation of the body 16 with the assembly ring cart 78) suitable for placement of the tooling assembly 12 and frame assembly 14. For example, the initial position may be a position such that the correct engineering locations 70 are proximate corresponding frame elements 24 upon the tooling segment 18 being positioned with respect to the surface of the body 16 (e.g., upon insertion of the tooling segment 18 within the body 16 or positioning of the tooling segment 18 outside of the body 16).

As shown at block 114, the tooling assembly 12 (FIG. 1), and the plurality of supported frame elements 24 (FIG. 3) (e.g., at least a portion of the frame assembly 14), may be positioned with respect to the body 16 (FIG. 2) (e.g., received within the interior region 26 of the body 16 or positioned about the exterior of the body 16). In accordance with the aircraft example, each tooling segment 18 (FIG. 7) of the tooling assembly 12 may be sequentially or simultaneously inserted within the interior region 26 of the body 16 by the positioning device 20 (FIGS. 14 and 15). The body 16 may be repositioned (e.g., by rotation) as required to further align the frame elements 24 to the engineering locations 70 (e.g., within nominal engineering tolerances). For example, Geometric Dimensioning and Tolerancing (GD&T) may be used to locate each of the frame elements 24 to the engineering locations 70 within nominal engineering tolerances. However, any other suitable technique or process for locating each of the frame elements 24 with respect to the body 16 may be used, without limitation.

As shown at block 116, the tooling assembly 12 and at least a portion of the frame assembly 14, may be temporarily secured to a position upon the body 16 (FIG. 5). For example, each tooling segment 18 may be temporarily secured in position with respect to the interior surface 38 of the body 16 (e.g., temporarily connected to the body 16). As another example, each tooling segment 18 may be temporarily secured in position with respect to the exterior surface 36 of the body 16 (e.g., temporarily connected to the body 16).

Also shown at block 118, the tooling assembly 12 may be disconnected from the positioning device 20. For example, each tooling segment 18 may be detached from the holding fixture 94 (FIGS. 14 and 15) and the positioning device 20 may be removed from the body 16, as shown at block 120.

As shown at block 122, each frame element 24 may be positioned with respect to the body 16, for example, to at least one corresponding engineering location 70 within nominal engineering tolerances (FIG. 12). For example, the frame elements 24 may be positioned with respect to the surface (e.g., interior surface 38 or exterior surface 36) of the body 16 (FIG. 2) by the plurality of cradle assemblies 68 (FIG. 11) disposed along each tooling element 22. Verification of the position of the frame elements 24 with respect to the corresponding engineering locations 70 may be performed using any suitable locating technique or process, for example by utilizing Determinate Assembly (DA) coordinated holes that line up from the body 16 to the frame elements 24. Gap checks may be performed and any excessive gaps (e.g., between the frame element 24 and the body 16) may be corrected (e.g., shimmed). All DA coordinating holes may be drilled and countersunk.

As shown at block 124, each frame element 24 of the frame assembly 14 (FIG. 3) may be connected to the body 16 (e.g., at the engineering location 70) (FIG. 12). As shown at block 126, the plurality of frame elements may be connected (e.g., spliced) together to form a full circumferential frame assembly 14 (FIG. 3).

As shown at block 128, the positioning device 20 may be repositioned proximate the tooling assembly 12 (FIG. 1). For example, the positioning device 20 (FIGS. 14-16) may be received (e.g., reinserted) within the body 16 (FIG. 2) and the tooling assembly 12, or tooling segments 18 (FIG. 7), may be reconnected to the positioning device 10 (e.g., the holding fixtures 94) (FIGS. 14-16), as shown at block 130.

As shown at block 132, the tooling assembly 12, or the tooling segments 18, may be disconnected from the corresponding frame elements 24. The tooling assembly 12 may be removed from the body 16, as shown at block 134. For example, each of the tooling segments 18 may sequentially or simultaneously be removed from the body 16.

In accordance with the aircraft example, a first tooling segment 18 may be connected to the holding fixture 94 of a dedicated positioning device 20. A first plurality of frame elements 24 may be loaded onto the first tooling segment 18. The body 16 may be rotated to a first position to locate a first plurality of engineering locations 70. The first tooling segment 18 may be positioned relative to the body 16 (e.g., inserted, such as horizontally, within the body 16) to position the first plurality of frame elements 24 at or near the first plurality of engineering locations 70. The first tooling segment 18 of the connected first plurality of frame elements 24 may be temporarily connected to the body 16 and the first tooling segment 18 may be detached from the corresponding holding fixture 94. Once detached from the first tooling segment 18, the positioning device 20 may be removed from the body 16.

A second tooling segment 18 may be connected to the holding fixture 94 of a dedicated positioning device 20. A second plurality of frame elements 24 may be loaded onto the second tooling segment 18'. The body 16 may be rotated to a second position to locate a second plurality of engineering locations 70. The second tooling segment 18 may be positioned relative to the body 16 (e.g., inserted, such as horizontally, within the body 16) to position the second plurality of frame elements 24 at or near the second plurality of engineering locations 70. The second tooling segment 18 of the connected second plurality of frame elements 24 may be temporarily connected to the body 16 and the second tooling segment 18 may be detached from the corresponding holding fixture 94. The second tooling segment 18 may be connected to the first tooling segment 18 (e.g., at the fastening mechanisms 66). Once detached from the second tooling segment 18, the positioning device 20 may be removed from the body 16.

Additional tooling segments 18 may be loaded with additional pluralities of frame elements 24 and sequentially positioned relative to the body 16 in a substantially similar manner as previously described for the first tooling segment 18 and the second tooling segment 18. Positioning and connection of the tooling segments 18 may continue until the frame elements 24 form a full frame assembly 14.

Upon installation (e.g., insertion) of a full complement of tooling segments 18 (e.g., forming the entire tooling assembly 12), the plurality of frame members 24 may be positioned and fastened to the body 16 at the engineering locations 70 as a single frame assembly 14. Upon the plurality of frame elements 24 being fastened to the body 16, each tooling segment 18 may be sequentially reconnected to its dedicated positioning device 20, disconnected from the adjacent tooling segments 18, disconnected from its associated plurality of frame elements 24, and removed from the body 16.

As another example of the disclosed method of installation, a single assembled (e.g., integral) tooling assembly 12 may be loaded with a plurality of frame elements 24. The plurality of frame elements 24 may define the entire frame assembly 14. The tooling assembly 12 may be secured in a substantially vertical orientation by a holding fixture. The body 16 may be positioned in a substantially vertical orientation and positioned with respect to the tooling assembly 12 in order to position the frame elements 24 proximate the engineering locations 70 (FIG. 12). For example, the body 16 may be positioned (e.g., lowered or raised) over the tooling assembly 12 such that the tooling assembly 12 may be received within the body 16 and the frame assembly 14 may be located proximate the interior surface 38 of the body 16. As another example, the body 16 may be positioned (e.g., lowered or raised) within the tooling assembly 12 such that the body 16 may be received within the tooling assembly 12 and the frame assembly 14 may be located proximate the exterior surface 36 of the body 16. The frame elements 24 may be positioned and fastened in a substantially similar manner as previously described. Upon the plurality of frame elements 24 being fastened to the body 16, the tooling assembly 12 may be disconnected from the plurality of frame elements 24 and the body 16 may be removed from the tooling assembly 12.

As such, the frame assembly may be installed to the body 16 (e.g., to the interior 38 or exterior 36) using either horizontal or vertical fixture orientation and the method may use automated positioning devices 20 or manual positioning devices 20 for tooling assembly placement with respect to the body 16.

Accordingly, the disclosed apparatus and method may provide for locating and installing a structural frame assembly to a fabricated composite one-piece body (e.g., fuselage). The apparatus and method may use tooling to locate each of a plurality of frame elements in a true position upon the body and relative to other frame elements for precise installation of the plurality of frame elements as a single assembly. The apparatus and method may solve for mislocation of the frame assembly relative to the fuselage, which may result in improvements to many secondary items, including an increase in initial quality and reduction in nonconformance.

Although various embodiments of the disclosed apparatus and method for installation of a frame assembly to a body have been shown and described, modifications may occur to those skilled in the art upon reading the specification. The present application includes such modifications and is limited only by the scope of the claims.

What is claimed is:

1. An apparatus comprising:
 a shell body comprising a continuous wall forming an open interior region and having a longitudinal axis and a shell body-shape, said shell body-shape being circular in cross-section;
 a frame assembly configured to be coupled to said continuous wall of said shell body within said open interior region of said shell body; and
 a tooling assembly configured to be positioned within said open interior region of said shell body and comprising a plurality of cradle assemblies configured to support said frame assembly between said tooling assembly and said shell body, each one of said plurality of cradle assemblies being movably coupled with said tooling assembly and movable along axes that are orthogonal to said longitudinal axis of said shell body to selectively position said frame assembly relative to said shell body at a plurality of predetermined engineering locations on a surface of said continuous wall.

2. The apparatus of claim 1 wherein:
said frame assembly comprises a plurality of frame elements, said plurality of frame elements being initially provided in an unconnected condition,
said tooling assembly comprises a plurality of tooling elements, and
each one of said plurality of tooling elements comprises at least one of said plurality of cradle assemblies, which is configured to support a corresponding one of said plurality of frame elements.

3. The apparatus of claim 2 wherein:
each one of said plurality of frame elements has a frame element-shape that approximately matches a portion of said shell body-shape, and
each one of said plurality of tooling elements has a tooling element-shape that approximately matches a portion of said shell body-shape, such that, when supported by said plurality of cradle assemblies, each one of said plurality of frame elements is independently positioned relative to said shell body proximate to a corresponding one of said plurality of predetermined engineering locations on said surface of said continuous wall.

4. The apparatus of claim 3 wherein said each one of said plurality of cradle assemblies is configured to be locked at a selected position along said axes that are orthogonal to said longitudinal axis of said shell body to hold a corresponding one of said plurality of frame elements relative to said shell body at a corresponding one of said plurality of predetermined engineering locations on said surface of said continuous wall.

5. The apparatus of claim 4 wherein movement of each one of said plurality of cradle assemblies adjusts a position of a corresponding one of said plurality of frame elements along said axes that are orthogonal to said longitudinal axis of said shell body relative to said plurality of predetermined engineering locations.

6. The apparatus of claim 1 wherein:
said frame assembly comprises a plurality of frame elements, said plurality of frame elements being initially provided in an unconnected condition,
said tooling assembly comprises a plurality of tooling segments, and
each one of said plurality of tooling segments comprises a portion of said plurality of cradle assemblies, which is configured to support a portion of said plurality of frame elements.

7. The apparatus of claim 6 wherein:
each one of said plurality of frame elements has a frame element-shape that approximately matches a portion of said shell body-shape, and
each one of said plurality of tooling segments has a tooling segment-shape that approximately matches a portion of said shell body-shape, such that, when supported by said portion of said plurality of cradle assemblies, each one of said portion of said plurality of frame elements is independently positioned proximate said surface of said shell body at said predetermined engineering location upon said tooling assembly being positioned proximate said body to a corresponding one of said plurality of predetermined engineering locations on said surface of said continuous wall.

8. The apparatus of claim 6 wherein each one of said plurality of tooling segments is configured to be releasably coupled to an adjacent one of said plurality of tooling segments to form said tooling assembly, said tooling assembly having a tooling assembly-shape that approximately matches said shell body-shape.

9. The apparatus of claim 6 wherein each one of said portion of said plurality of cradle assemblies is configured to be locked at a selected position along said axes that are orthogonal to said longitudinal axis of said shell body to hold a corresponding one of said portion of said plurality of frame elements relative to said shell body at a corresponding one of said plurality of predetermined engineering locations on said surface of said continuous wall.

10. The apparatus of claim 9 wherein movement of each one of said portion of said plurality of cradle assemblies adjusts a position a corresponding one of said portion of said plurality of frame elements along said axes that are orthogonal to said longitudinal axis of said shell body relative to said plurality of predetermined engineering locations.

11. The apparatus of claim 1 further comprising at least one positioning device configured to position said tooling assembly relative to said shell body within said open interior region of said shell body, such that said tooling assembly is positioned proximate said surface of said continuous wall.

12. The apparatus of claim 1 wherein said cradle assembly comprises a saddle adjustably connected to a stanchion.

13. The apparatus of claim 12 wherein said stanchion is adjustably connected to said tooling assembly.

14. An apparatus comprising:
a fuselage body comprising a continuous wall forming an open interior region and having a longitudinal axis and a fuselage body-shape, said fuselage body-shape being circular in cross-section;
a plurality of frame elements defining an airframe, said plurality of frame elements being initially provided in an unconnected condition; and
a tooling assembly comprising:
a plurality of tooling elements configured to support said plurality of frame elements; and
a plurality of cradle assemblies movably coupled to said plurality of tooling elements and configured to support said plurality of frame elements between said frame assembly and said fuselage body, each one of said plurality of cradle assemblies being movable along axes that are orthogonal to said longitudinal axis of said fuselage body to selectively position each one of said plurality of frame elements relative to said fuselage body; and
at least one positioning device configured to support said tooling assembly and selectively position said plurality of tooling elements relative to said fuselage body within said interior region of said fuselage body,
wherein movement of each one of said plurality of cradle assemblies relative to a corresponding one of said plurality of tooling elements selectively positions a corresponding one of said plurality of frame elements relative to said fuselage body along said axes that are orthogonal to said longitudinal axis of said fuselage body so that said plurality of frame elements has an airframe-shape that approximately matches said fuselage body-shape and holds said airframe relative to a plurality of predetermined engineering locations each one of said plurality of frame elements is independently located at a corresponding engineering location on an interior surface of said continuous wall.

15. The apparatus of claim 14 wherein:
said tooling assembly comprises a plurality of tooling segments, each one of said plurality of tooling segments comprising a portion of said plurality of tooling elements,
said positioning device comprises a holding fixture plurality of holding fixtures, each one of said plurality of holding fixtures being configured to support a corresponding one of said plurality of tooling segments, and
said plurality of holding fixtures is configured to selectively position said plurality of tooling segments so that said tooling assembly has a tooling assembly-shape that approximately matches said fuselage body-shape.

16. The apparatus of claim 14 wherein said cradle assembly comprises a saddle adjustably connected to a stanchion.

17. The apparatus of claim 16 wherein said stanchion is adjustably connected to said tooling element.

18. A method for installation of a frame assembly to a body, said method comprising the steps of:
providing a shell body comprising a continuous wall forming an open interior region and a longitudinal axis and having a shell body-shape, said shell body-shape being circular in cross-section;
providing a plurality of frame elements in an unconnected condition;
providing a tooling assembly having a tooling assembly-shape that approximately matches at least a portion of said shell body-shape, said tooling assembly comprising a plurality of cradle assemblies configured to support said plurality of frame elements, each one of said plurality of cradle assemblies being movable relative to said tooling assembly along axes that are orthogonal to said longitudinal axis of said shell body;
supporting said plurality of frame elements onto on said tooling assembly to configure a frame assembly having a frame assembly-shape that approximately matches at least a portion of said shell body-shape;
positioning said tooling assembly to be proximate to said shell body within said open interior region of said shell body such that said plurality of frame elements is positioned between said tooling assembly and said shell body;
moving each one of said plurality of cradle assemblies to selectively position a corresponding one of said plurality of frame elements along said axes that are orthogonal to said longitudinal axis of said shell body at a corresponding one of a plurality of predetermined engineering locations on a surface of said continuous wall;
fastening said plurality of frame elements to said shell body at said plurality of engineering locations; and
removing said tooling assembly from within said open interior region of said shell body.

19. The method of claim 18 wherein positioning said tooling assembly comprises at least one of linearly moving said tooling assembly parallel with said longitudinal axis of said shell body, linearly moving said tooling assembly perpendicular to said longitudinal axis of said shell body, and rotating said tooling assembly about said longitudinal axis of said shell body.

20. The method of claim 18 further comprising:
moving each one of said plurality of cradle assemblies relative to said frame assembly to a select position in which a corresponding one of said plurality of frame elements is in contact with said surface of said continuous at a corresponding one of the plurality of predetermined engineering locations on the surface of said continuous wall; and
locking each one of said plurality of cradle assemblies relative to said frame assembly at said select position.

\* \* \* \* \*